United States Patent [19]
Kobayashi et al.

[11] Patent Number: 6,153,997
[45] Date of Patent: Nov. 28, 2000

[54] DISK APPARATUS AND METHOD OF CONTROLLING DISK APPARATUS

[75] Inventors: Masahito Kobayashi, Ushiku; Iwao Oshimi, Kanagawa-ken; Yoshio Soyama, Odawara; Akio Shioya, Shizuoka-ken; Yuji Hata, Odawara, all of Japan

[73] Assignee: Hitachi, Ltd., Tokyo, Japan

[21] Appl. No.: 09/229,833

[22] Filed: Jan. 13, 1999

[30] Foreign Application Priority Data

Jan. 13, 1998 [JP] Japan .................................. 10-004469

[51] Int. Cl.⁷ .......................... G11B 21/02; G11B 5/596; G11B 5/56
[52] U.S. Cl. ...................... 318/560; 318/561; 360/77.02; 360/77.04; 360/75
[58] Field of Search .................................... 318/560–696; 360/72–88; 369/44.35, 44.36; 375/290, 340; 708/3, 300, 320, 322, 323

[56] References Cited

U.S. PATENT DOCUMENTS

| | | | |
|---|---|---|---|
| 4,200,827 | 4/1980 | Oswald | 318/561 |
| 4,594,622 | 6/1986 | Wallis | 360/77 |
| 5,291,110 | 3/1994 | Andrews et al. | 318/560 |
| 5,659,436 | 8/1997 | Yarmchuk et al. | 360/75 |
| 5,661,615 | 8/1997 | Waugh et al. | 360/75 |
| 5,774,286 | 6/1998 | Shimoda | 360/46 |
| 5,796,544 | 8/1998 | McMurtrey | 360/77.07 |
| 5,835,302 | 11/1998 | Funches et al. | 360/78.07 |
| 5,875,064 | 2/1999 | Chainer et al. | 360/75 |
| 5,898,535 | 4/1999 | Kawai | 360/77.02 |
| 5,907,447 | 5/1999 | Yarmchuk et al. | 360/75 |
| 5,936,789 | 8/1999 | Mukohara | 360/77.04 |
| 6,003,051 | 12/1999 | Okazaki | 708/3 |

FOREIGN PATENT DOCUMENTS

| | | |
|---|---|---|
| 09082050 | 3/1997 | Japan . |
| 09139032 | 5/1997 | Japan . |

*Primary Examiner*—Paul Ip
*Attorney, Agent, or Firm*—Antonelli, Terry, Stout & Kraus, LLP

[57] ABSTRACT

A disk apparatus has a position signal detector for detecting the position of a head with a specified sampling period, a controller operating a manipulated variable to control positioning of the head using a microprocessor and a digital/analogue converter with which the manipulated variable is converted. At least one or more timing registers set the timing of the conversion carried out by the D/A converter and at least one or more manipulated variable registers set a manipulated variable that is converted into digital/analogue form at the set timing. In addition, the controller has advancing means to make a target position trajectory advance towards a specified time, a feedforward controller to receive the output of the advancing means and to calculate a feedforward control variable on the basis of a target trajectory, and a feedback controller to produce a feedback output variable on the basis of a target trajectory that is delayed relative to a target position trajectory by a specified time.

8 Claims, 16 Drawing Sheets

FIG. 14

| STEP COUNT | THE TARGET POSITION TABLE tbl_pos[COUNT] | THE TARGET ACCELERATION TABLE tbl_acc[COUNT][MCOUNT] | | | |
|---|---|---|---|---|---|
| | | tbl_acc[][0] | tbl_acc[][1] | tbl_acc[][2] | tbl_acc[][3] |
| 0 | 1.000 | 121.5625 | 192.0417 | 230.2500 | 239.8333 |
| 1 | 0.9936 | 239.3125 | 239.3542 | 239.3333 | 233.8542 |
| 2 | 0.9158 | 204.6042 | 162.7500 | 119.4583 | 76.2708 |
| 3 | 0.7482 | 33.0625 | -10.1458 | -53.3542 | -96.5625 |
| 4 | 0.5287 | -134.2917 | -148.2500 | -149.6042 | -149.5208 |
| 5 | 0.3226 | -149.5417 | -149.5208 | -149.5208 | -149.5208 |
| 6 | 0.1711 | -149.5208 | -145.8750 | -127.8333 | -105.2500 |
| 7 | 0.0771 | -85.9792 | -70.2708 | -57.4167 | -46.9375 |
| 8 | 0.0325 | -38.3542 | -31.3542 | -25.6250 | -20.9375 |
| 9 | 0.0129 | -17.1042 | -13.9792 | -11.4167 | -9.3333 |
| 10 | 0.0046 | -7.6250 | -6.2292 | -5.1042 | -4.1667 |
| 11 | 0.0013 | -3.3958 | -2.7917 | -2.2708 | -1.8542 |
| 12 | 0.0001 | -1.0000 | -0.1667 | 0 | 0 |
| 13 | 0 | 0 | 0 | 0 | 0 |
| 14 | 0 | 0 | 0 | 0 | 0 |
| 15 | 0 | 0 | 0 | 0 | 0 |

DISK APPARATUS AND METHOD OF CONTROLLING DISK APPARATUS

BACKGROUND OF THE INVENTION

The present invention is concerned with head positioning in a disk apparatus, such as a magnetic disk drive apparatus and an optical disk drive apparatus. Especially, the present invention relates to a disk apparatus that moves a head with high speed by position control and to a method of controlling the position of a head in a disk apparatus.

The method of positioning a head on the basis of servo information in a conventional disk apparatus typically involves a seek operation and a follow operation. A seek operation is an operation in which a head is moved at high speed on a virtual track cylinder to a target position. A follow operation is an operation in which the track center of a target is followed with high precision.

The seek time (time required to move a head to a target track during a seek operation) and the positioning precision (precision of a head during a follow operation) are the important elements that determine the storage capability and apparatus performance in a magnetic disk apparatus.

A technique that does not need a change in control mode to speed up an operation in which a short span is sought and that does a seek operation only by position control is disclosed in Japanese patent Laid-open Publication 9-82050 official gazette and Japanese patent Laid-open Publication 9-139032 official gazette.

Many head control systems are known to operate in the following way. A position signal is detected from a signal read by a head. The manipulated variable of a head is calculated by a microprocessor on the basis of the detected position signal. The microprocessor system then outputs the manipulated variable via a power amplifier to move the head. That is, the microprocessor system outputs one manipulated variable for each sampling period.

It is important to shorten the sampling period to achieve high speed movement of the head and high precision positioning of the head. For a disk drive, for example, a magnetic disk drive, storing a lot of positioning data on the recording area on the disk undesirably affects the storage capacity for recording information data, because the larger the positioning data area is, the smaller the information data storing area becomes.

Japanese patent Laid-open Publication 9-82050 discloses a system which outputs many more control signals from a controller per unit time than the number of times which a head crosses a position data area on the disk. In this system, the disk drive has a disk control controller that includes a feedforward controller and a feedback controller to position a head. At the end of a calculation by the feedback controller or the feedforward controller, the disk control controller outputs a periodic control signal.

The above-mentioned controller systems are insufficient in the following points.

(1) To enable the head to be moved with a high speed, the above-mentioned control systems carry out a seek operation using a target acceleration trajectory that is a target trajectory relative to the head acceleration and a target position trajectory that is a target trajectory relative to the head position. But, in these control systems, no consideration is given to discreteness or a delay in the control at the time of designing each target trajectory. In addition, at the time of designing a target trajectory, the calculation time of the feedforward controller and the calculation time of the feedback controller have not been taken into account.

Therefore, in the above-mentioned control systems, it is necessary to correct the target position trajectory one after another after setting up a target position trajectory correction value separately determined through trial and error. And, it is necessary in these known control systems, for example, to output control values to a D/A converter sequentially at the end of each calculation by the controller.

(2) The above-mentioned control systems performs a multirate control that effects a processing with a predetermined timing by sampling ½ of the sampling that acquires a position signal as the timing in which a target acceleration trajectory is output. These control systems determine the timing of a multirate output signal by software processing. Therefore, there is a problem in the following points.

It is impossible to set an accurate multirate sampling period.

It is difficult to optionally set the number of multirate outputs that are output in one sampling.

(3) In the above-mentioned control systems, it is difficult to further shorten the seek time, because the target acceleration trajectory has the form of a symmetrical triangular waveform during acceleration and deceleration. Therefore, in these control systems, it is necessary to set the movement period of a target trajectory at more than double the resonant period of the head support mechanism.

The above items represent important problems that should be solved in the design of a high-speed head positioning system in a disk apparatus.

SUMMARY OF THE INVENTION

An object of the present invention is to provide a disk apparatus and a positioning control method for enabling the generation of a position signal to control movement of a head to accurately follow a head movement trajectory to a set target position.

Another object of the present invention is to provide a ask apparatus and a positioning control method which is capable of setting an accurate head position by using a digital circuit which produces a number of outputs for multirate control during a multirate sampling period.

In addition, a further object of the present invention is to provide a disk apparatus and a head positioning control method which is capable of controlling the shape of a target acceleration trajectory, which is asymmetrical in acceleration and deceleration, to move a head to a target position.

In order to achieve the foregoing objects, the disk apparatus and the positioning control method of the present invention provide the following performance.

According to the present invention, the disk apparatus and the positioning control method of the present invention can operate such that the movement period of a head can be provided for 1.5 times or more than resonant period of a head support mechanism and that a settling of a positioning of the head is favorable.

To achieve the foregoing objects of the present invention, the disk apparatus and the head positioning control method of the present invention determine a target trajectory on the basis of discreteness for a control target, the calculation of a time delay, and a phase delay of a notch filter or a power amplifier.

To achieve the foregoing objects, the present invention has the following structure. In a disk apparatus with a position signal detector for detecting the position of a head during a specified sampling period, a controller operating in response to a manipulated variable to control positioning of a head with a microprocessor and a digital/analogue converter by which the manipulated variable is converted, there is provided at least one or more timing registers that set the timing of conversion by the D/A converter and at least one or more manipulated variable registers that set the manipulated variable that is converted into a digital analogue value by the set timing.

In addition, the present invention has the following structure. In a disk apparatus with a position signal detector for detecting the position of a head during a specified sampling period, a controller operating in response to a manipulated variable to control positioning of a head with a microprocessor and a digital/analogue converter by which the manipulated variable is converted, there is provided a controller having advancing means to cause a target position trajectory to advance towards a specified time, a feedforward controller to be supplied with the output of said advancing means and to calculate a feedforward control variable on the basis of a target trajectory, and a feedback controller to operate on a feedback output variable on the basis of a target trajectory that is delayed relative to a target position trajectory a specified time.

Still further advantages of the present invention will become apparent to those of ordinary skill in the art upon reading and understanding the following detailed description of the preferred embodiments.

BRIEF DESCRIPTION OF THE DRAWING

The invention will be described in conjunction with the accompanying drawings, which illustrate preferred embodiments of the invention only, and are not to be construed as limiting the same, wherein:

FIG. 14 shows a table of the target position trajectory and the target acceleration trajectory.

DETAILED DESCRIPTION OF THE PREFERRED AND ALTERNATE EMBODIMENTS.

Embodiments of the disk apparatus of the present invention and its control method will be explained.

Figure 1:
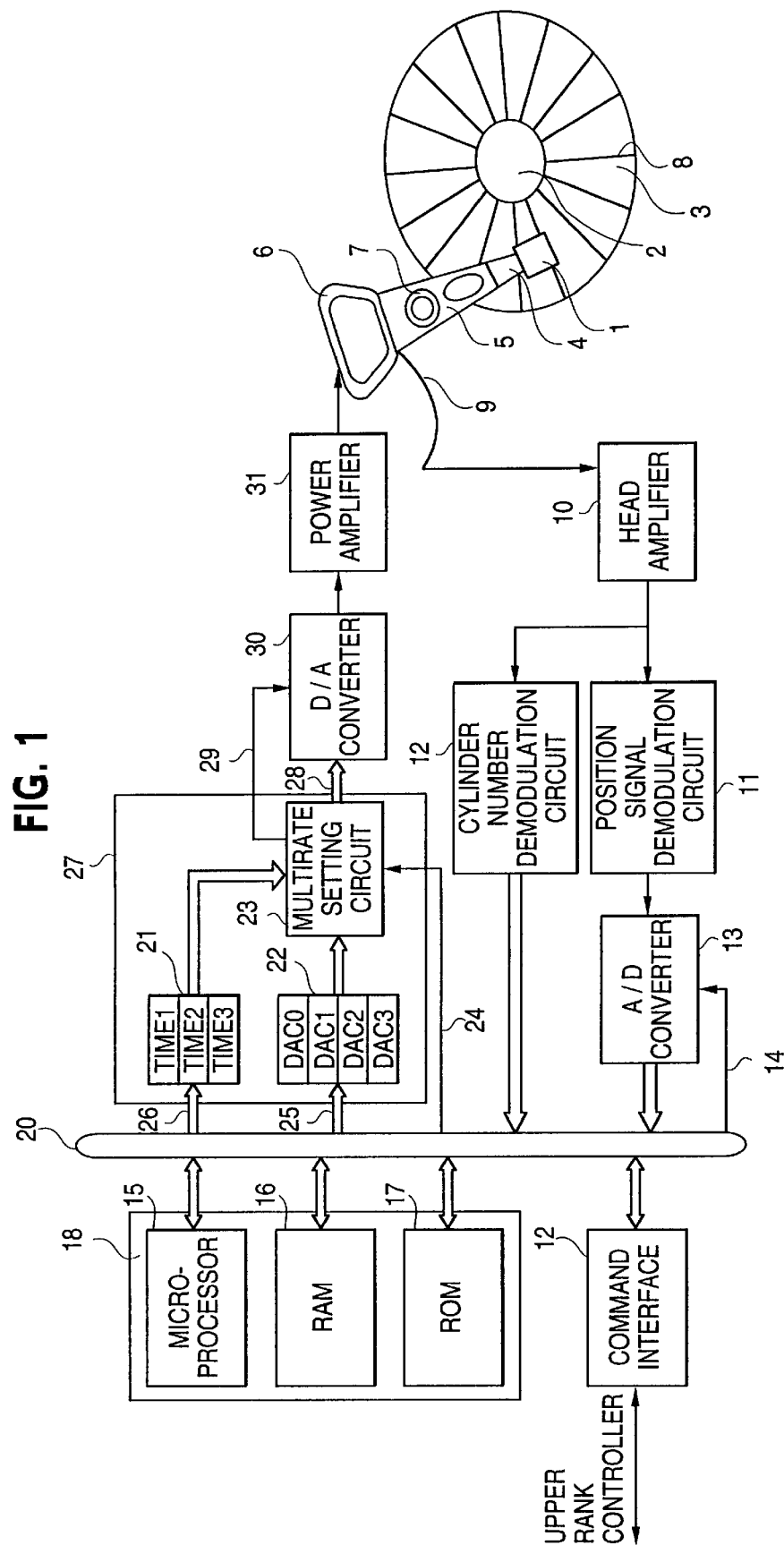
FIG. 1 is a schematic block diagram of a disk apparatus according to the present invention.

FIG. 1 is a block diagram of one example of the disk apparatus according to the present invention. This figure shows the hardware that implements the multirate control that outputs a four-time manipulated variable to a power amplifier 31 while acquiring a following position signal after acquiring a position signal.

In FIG. 1, a multirate setting system 27 controls the timing to output the manipulated variable that is the calculation result of multirate control. In order to effect control using the multirate setting system 27, the disk apparatus according to this invention achieves the following effects. The number of the manipulated variables that drive a head can be increased without reducing the data memory area. The output electric current of the power amplifier 31 becomes smooth. It is possible to achieve a speed-up of a reduction in vibration while head 1 during movement of the head.

The operation of the multirate setting system 27 will be explained. A recording or reproduction instruction is sent from a upper rank controller to command interface 12 of the magnetic disk drive. Command interface 12 indicates a movement of the head 1 to the microprocessor 15. For example, the indication provided by the command interface 12 may be for movement of the head 1 to a target track formed on the magnetic disk 3. Magnetic disk 3 is mounted for rotation about an axis 2 and is driven by a spindle motor (not shown). Head 1 is positioned in a space a little above the surface of the magnetic disk 3. Head 1 is supported by board spring 4, which is supported on a carriage arm 5. Carriage arm 5 is fixed to a voice coil motor 6. Head 1 moves in the direction from outside to inside or from inside to outside of the magnetic disk 3 centering on the pivot axis 7 with a movement produced by the voice coil motor 6. Head 1 reads or writes on a track of the magnetic disk 3 and supplies a signal through head amplifier circuit 10 and a Read/Write circuit (not shown).

The method of positioning the head with the magnetic disk drive in this embodiment adopts a sector servo method for high recording density. The sector servo method is a way of positioning the head by reading servo information 8 recorded in the first sector of each track on the disk 3 and by using the information 8. Servo information 8 is amplified by head amplifier 10 after passing through a flexible printed circuit (FPC) 9. Amplified servo information 8 is translated into a position signal in position signal demodulation circuit 11. For rotating disk 3 by a constant number of revolutions per unit time, servo information 8 is transformed at intervals of a constant time. The interval is called a sampling time and is represented by Ts. The position signal is converted into a digital signal by the Analogue/Digital (A/D) converter 13 at the timing on a A/D converter read flag signal 14, which operates as a trigger. And, there is data representing a cylinder number recorded in the servo information 8, and this data is demodulated by cylinder number demodulation circuit 12. The position signal and the cylinder number data are supplied to microprocessor 15 through bus line 20.

Microprocessor system 18 consists of a RAM (Random Access Memory) 16 and a ROM (Read Only Memory) 17, which are connected to microprocessor 15 through bus line 20.

ROM 17 stores programs, such as various control systems programs. RAM 16 temporarily stores the state variable of the following controller of a position control system, a variable gain, etc. Microprocessor 15 executes various control programs and outputs a manipulated variable (control quantity including a target position, target acceleration, etc.) that is the command value that drives head 1 via the D/A converter 30.

In the conventional controller, microprocessor 15 outputs one manipulated variable between sampling periods. But in this embodiment of the invention, four manipulated variables are output in one sampling time TS. The output manipulated variables are stored in a respective one of four registers 22 in multirate setting system 27. Each of the four manipulated variables (DAC0, DAC1, DAC2 and DAC3) is converted into an analogue signal by the D/A converter 30 at a timing set by a timing register 21 in the multirate setting system 27. The converted four manipulated variables (DAC0, DAC1, DAC2 and DAC3) are sent from D/A converter 30 to power amplifier 31 for driving voice coil motor 6. On the basis of the four manipulated variables (DAC0, DAC1, DAC2 and DAC3), which are amplified by power amplifier 31, the head 1 is positioned.

Multirate setting system 27 shown in FIG. 1 is composed of the multirate setting circuit 23, the four multirate manipulated variable registers 22 and the three timing registers 21. Multirate setting circuit 23 is the circuit that outputs a manipulated variable (DAC0, DAC1, DAC2, DAC3) stored in the multirate manipulated variable register 22 to the D/A converter 30 according to a timing (TIME1, TIME2, TIME3) determined in advance and stored in timing register 21. The timing (TIME1, TIME2 and TIME3) establishes a certain timing, as stored in timing register 21, at which to convert a manipulated variable into a Digital/Analogue value within a constant period (a multirate period). The multirate period is a period into which the sampling time Ts is divided by four. (Tss=Ts/4). The multirate setting circuit 23 starts an operation in response to a timer start flag 24 and sends the D/A converter write flag 29 to the D/A converter 30.

The operation timing of the multirate setting system 27 will be explained in detail with reference to FIG. 2, and the detailed hardware structure of the multirate setting system 27 will be explained with reference to FIG. 3. In this example, the operation of the multirate setting circuit 27 will be described only for the case in which servo information is divided into four. But, it should be understood that the present invention is not limited to four partitions of the servo information and that any number of partitions may be employed. The disk drive in this embodiment can control positioning of the head with high accuracy because of the provision of the circuit to divide the servo information and to output it with a specified timing.

The period of the interruption flag 35 of the servo information (sector information) 8 represents a constant sampling time Ts. In this embodiment, the sampling time TS is 150 $\mu$s. When a trailing edge of the interruption flag 35 of the servo information is detected, position signal demodulation circuit 11 operates and read flag 36 of the A/D converter 13 falls. When the read flag 36 of A/D converter 13 falls, microprocessor 15 reads a position signal. Microprocessor 15 generates a valid position signal in all cylinders from the position signal and the cylinder number demodulated in the cylinder demodulation circuit 12 and calculates the manipulated variable that drives head 1 to move to the target track at high speed on the basis of the valid position signal (39-1).

The method of calculating a manipulated variable will be explained in detail later with reference to FIG. 4. A manipulated variable calculated at the beginning of the sampling time after reading a position signal for driving the head is called the first manipulated variable and is represented in DAC0. For this calculated manipulated variable DAC0, multirate setting circuit 23 sends the D/A converter write flag 37 to the D/A converter 30 at once. on the basis of the D/A converter write flag 37, the D/A conversion is implemented with the D/A converter 30. And, the time Td is defined as the time from the trailing edge of read flag 36-1 of the A/D converter 13 to the trailing edge of write flag 37-1 of the D/A converter 30 relative to the first manipulated variable DAC0. This time Td is called a calculation time delay for the time spent for calculation of the first manipulated variable.

After calculating the first manipulated variable DAC0, Timer start flag (38-1) is set. And the second, the third and fourth manipulated variables DAC1, DAC2 and DAC3 are calculated (39-2), and these manipulated variables are stored in specified manipulated variable register 22. multirate setting system 27 starts a count of time from a trailing edge of timer start flag 38-1 and supervises the time. And then, the D/A converter write flag 37-2 is set, because the second manipulated variable DAC1 is converted in the D/A converter 30 and is output to the power amplifier 31 after the time TIME1. In the same way, the D/A converter write flag 37-3 is set, because the third manipulated variable DAC2 is converted in the D/A converter 30 and is output after a time TIME2 from the timer start flag trailing edge. And then, the D/A converter write flag 37-4 is set because the fourth manipulated variable DAC3 is converted in the D/A converter 30 and is output after a time TIME3 from the timer start flag trailing edge. The calculation of the manipulated variable from DAC1 to DAC3 is carried out after outputting the first manipulated variable DAC0 (39-2). As a result, the calculation time delay Td is not influenced.

Figure 2:
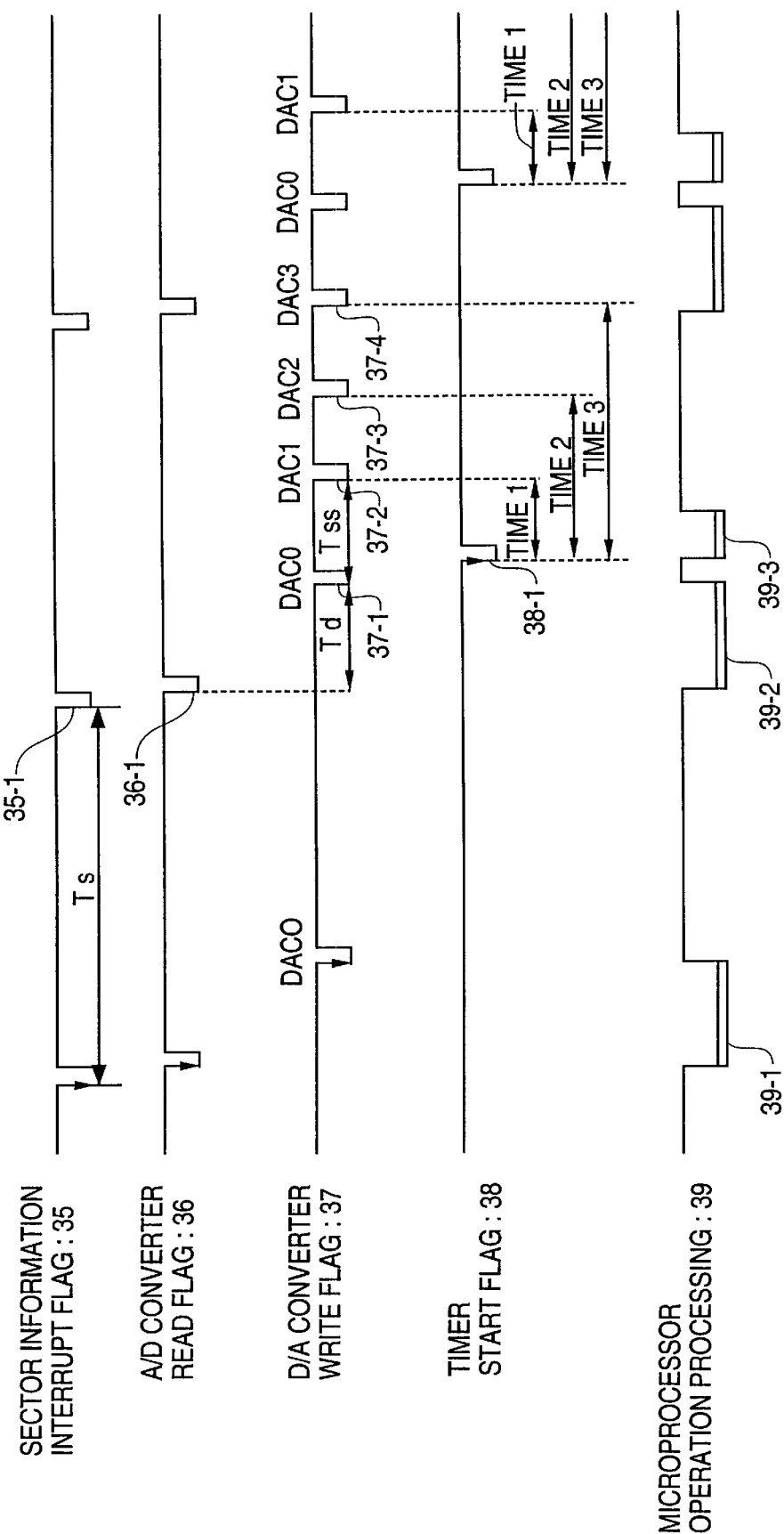
FIG. 2 is a timing diagram showing the operation timing of a multirate setting system.

For example, the case explained with reference to FIG. 2 is a case in which the multirate output is output in multirate period (Tss 37.5 $\mu$s) into which a servo period (Ts=150 $\mu$s) was divided into four parts uniformly. The setting of each parameter in this case will be mentioned below.

Let us suppose that it takes 10 $\mu$s from outputting first manipulated variable DAC0 (37-1) to the time at which the timer start flag (38-1) is set. As a result, each timer register 21 is set as follows: TIME1=37.5 10=27.5 $\mu$s, TIME2=75−10=65 $\mu$s, and TIME3=112.5 10=102.5 $\mu$s. According to the present invention, it is possible to divide the sampling time in any way by changing the values stored in the timer registers, not only by dividing a servo period into four parts uniformly. And, the multirate processing becomes valid by the setting of the timer start flag 38. There are a very large number of in which the servo period is synchronized to the sampling time. In accordance with the present invention, however, it is possible to divide the sampling time further and to control the head positioning to achieve as smooth and as highly-precise a movement as afforded by analogue control. The present invention also permits the conventional single rate processing that is carried out only by the first manipulated variable DAC0 to be employed, if the timer start flag is not set.

Figure 3:
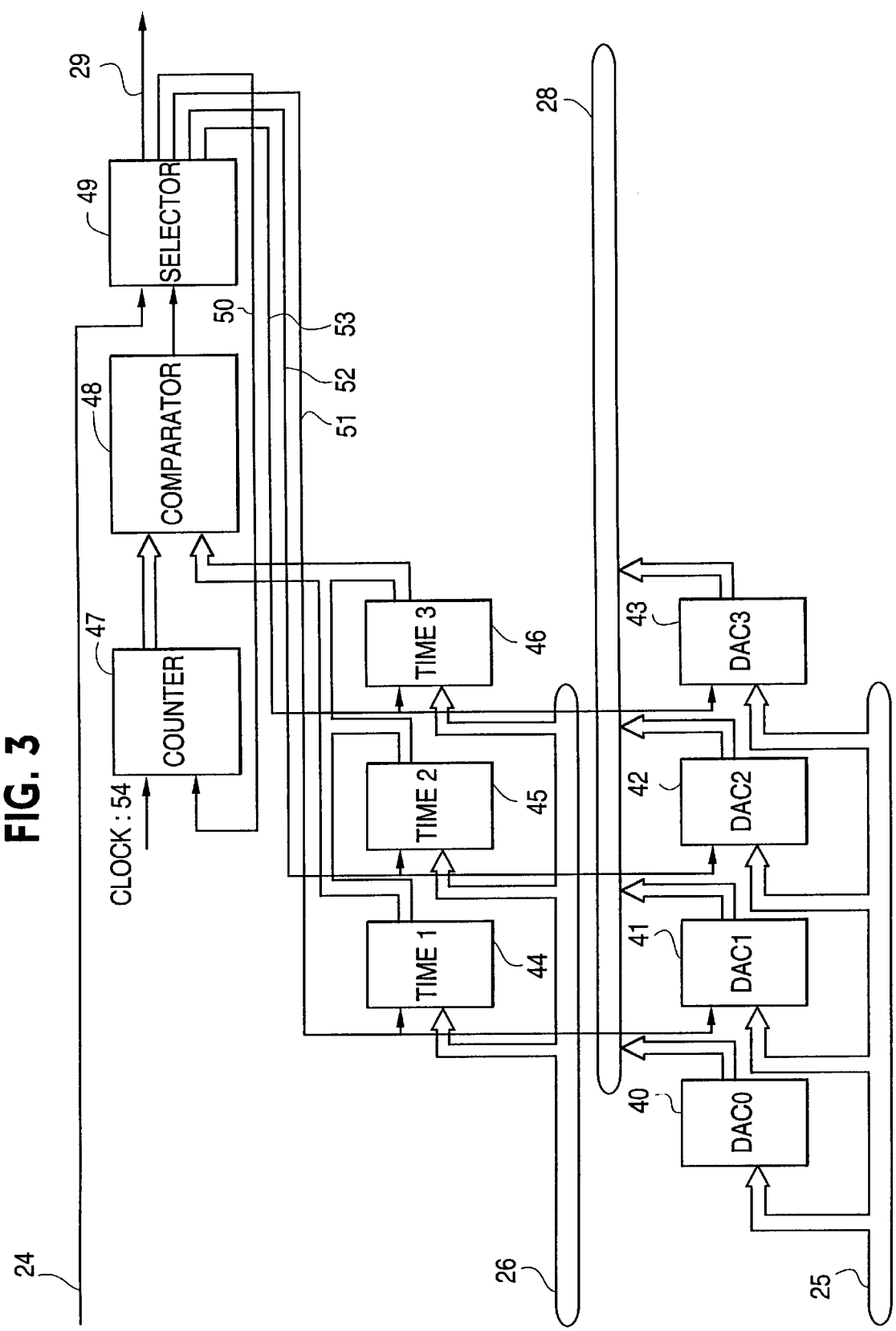
FIG. 3 is a schematic circuit diagram of a multirate setting system.

FIG. 3 shows an example of the detailed circuit structure of the multirate setting system 27 that is shown in FIG. 1.

Multirate setting system 27 consists of four flip-flop circuits 40–43 that correspond to the four manipulated variable registers 22; three flip-flop circuits 44–46 that correspond to the three timing registers 21; a counter circuit 47; a comparator 48 that compares the output of a counter and the output of a timing register; and a selector 49 that determines the manipulated variable that is output to the D/A converter 30 according to the output of a comparator 48.

Microprocessor 15 sets the value of DAC0 at flip-flop circuit 40 through bus line 25 and also sets the D/A conversion write flag 29, when the value of DAC0 is written in the first manipulated variable register.

When timer start flag 24 is set at selector 49, selector 49 clears the output of counter 47 to zero. Microprocessor system 18 writes the second manipulated variables DAC1, the third manipulated variables DAC2, and the fourth manipulated variable DAC3 in manipulated variable register 22. The value of each manipulated variable is set at flip-flop circuits 41–43. And, micro processor 18 writes the value of a time TIME1, TIME2, and TIME3, respectively, in timing register 21 by setting flip-flop circuits 44–46 through bus line 26.

Counter 47 counts up in response to clock 54 of the set resolution. The clock 54 is 2 MHz here. That is, one clock count is 0.5 $\mu$s. Selector 49 selects flag 51 at the time of the setting of timer start flag 24. Furthermore, selector 49 sets a value of the time TIME1 at comparator 48 and a value of the manipulated variable DAC1 at the D/A converter 30. For example, it is desirable that TIME1=55 is set at timing register 21 to realize TIME1=27.5 $\mu$s. Comparator 48 sends an output signal to selector 49, when TIME1 and the output of the counter become equal, namely when the value of the counter becomes 55. Selector 49 sends the D/A converter write flag 29 to D/A converter 30. The D/A converter 30 translates the predetermined value of DAC1 into an analogue signal and outputs it to power amplifier 31. After the above operation ends, selector 49 selects flag 52, and, in the same way mentioned above, sets a value of the time TIME2 at the comparator 48 and a value of the manipulated variable DAC2 at the D/A converter 30. When TIME2 and the output of the counter become equal, DAC2 is output from the D/A converter 30. Finally, selector 49 selects flag 53, and sets a value of the time TIME3 at comparator 48 and a value of the manipulated variable DAC3 at D/A converter 30. When TIME3 and the output of the counter become equal, DAC3 is output from the D/A converter 30.

With the system and operation illustrated in FIG. 1 through FIG. 3, the manipulated variable on sampling increases from the one manipulated variable used in the prior systems to the several (four in this embodiment, but not limited only four). According to the present invention, the drive electric current for the head becomes more smooth, finer control is enabled, and it is possible to realize a head positioning control system which is capable of a high-speed movement of the head, which exhibits a reduction in vibration and which is free of disturbance.

The software processing relating to the multirate control that contributes to high-speed movement of the head, etc. in accordance with the present invention, using the above-described hardware, will now be described. FIG. 4 is a functional block diagram of the positioning multiple rate control system that represents an example of the disk apparatus to which the present invention is applicable.

Furthermore, in the method of moving the head fast, which is applied by combining a feedforward controller and a feedback controller, the conventional basic way of thinking of a feedforward control system is that the feedforward controller is set to the inverse dynamics for the target of control. Then, the transfer function from the target position trajectory to the control output becomes 1, and the head position follows the target position trajectory. The difference between the head position and a target position, that is, the tracking error, is suppressed by a following controller. Now, there is a known method of separately setting up a required target position trajectory correction value through trial and error and correcting values of a target position trajectory one after another. And, in the known method, it is necessary that controllers send an output to the D/A converter sequentially, after controllers have calculated values sequentially.

The present invention makes it possible to set a target trajectory on the basis of a discreteness for control, a calculation time delay and a phase delay of a notch filter and a power amplifier.

The first feature of a present invention concerns the provision of a feedforward control system for causing the head to follow the target position trajectory with high precision based on use of a future predicted value of the target trajectory, that ignores the phase difference of the response from the target position trajectory to the position of the head that represents a control quantity. In accordance with this invention, only a certain value is set in advance for the target position trajectory substituted for a feedforward control system. In FIG. 4, it becomes the structure that calculates a feedforward control by the multirate period Tss.

The second feature of this invention is to delay only a certain value relative to the target position trajectory that is added to a feedback control system. In FIG. 4, the feedback control system comprises a structure in which calculation is performed for a single rate period (sampling period) Ts.

In addition, the third feature concerns a disk apparatus having a target trajectory that is not easy to be in a stimulus with the mechanical system that supports the head. And, the method of designing a target trajectory is mentioned later with reference to FIG. 9. By the above features, the disk apparatus to which the present invention is applied can realize a high-speed and accurate movement of the head.

Figure 4:
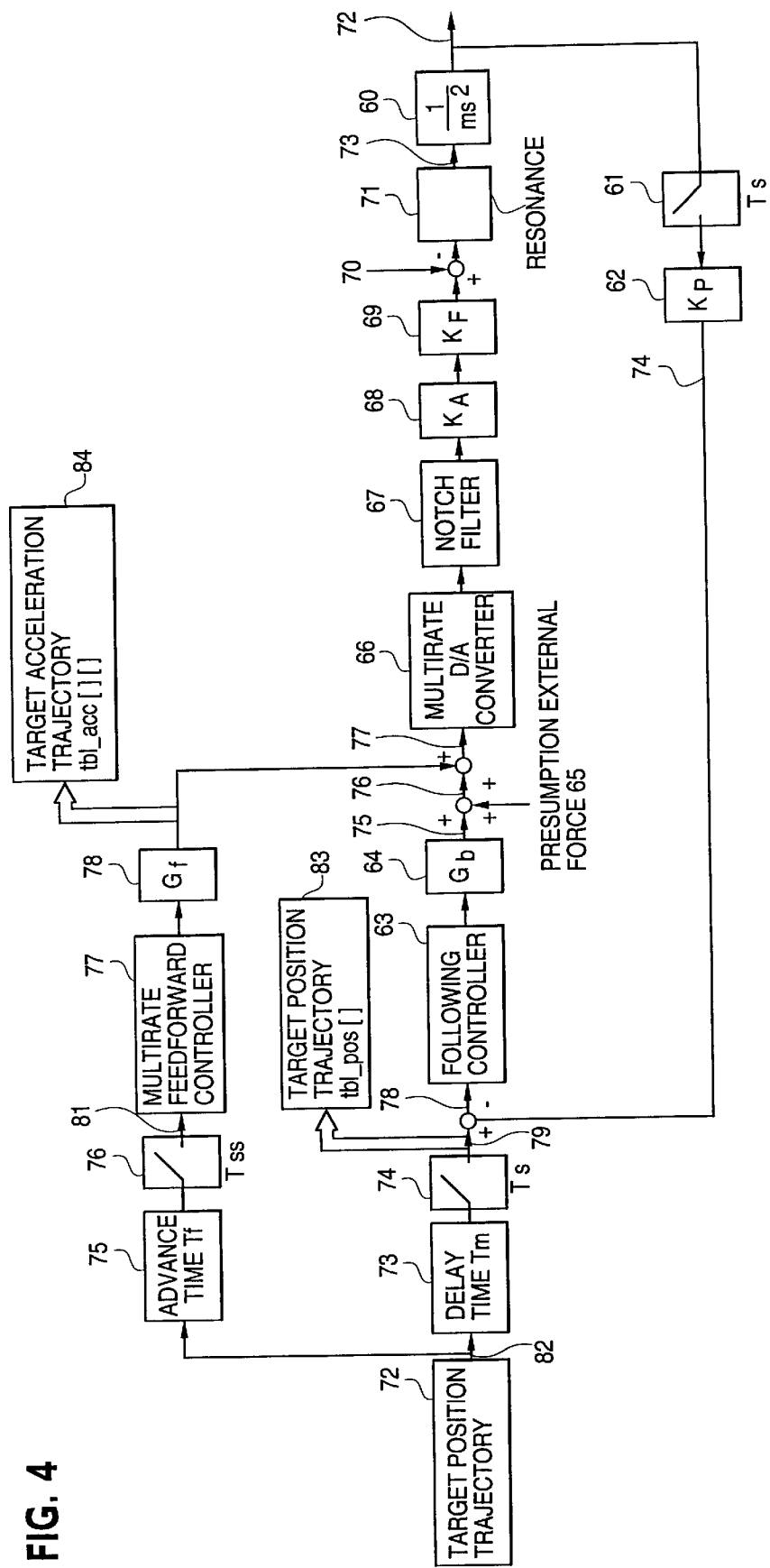
FIG. 4 is a functional block diagram of a positioning control system according to the present invention.

FIG. 4 shows a system which includes multirate D/A converter 66 and a multirate feedforward controller 77. Multirate D/A converter 66 corresponds to multirate setting system converter 27 and D/A converter 30. In FIG. 4, a notch filter 67 suppresses mechanical resonance 71. In addition, there is the gain of $K_A$ 68 of the power amplifier 31 that drives voice coil motor 6 and the thrust constant $K_F$ 69 of the voice coil motor 6.

External force 70 is the external force added to the carriage 5 by FPC9 and other elements shown in FIG. 1. Corresponding to the track position of a head, this power fluctuates. In this figure, the carriage on which the head shown in FIG. 1 is mounted is modeled as an inertia field 60 of mass M. The carriage has a mechanical resonance 71 due to the elastic deformation and bending characteristics of the pivot unit. The position of the head (72) is detected as a sample (61) at intervals of the servo information 8. This sample time is Ts. $K_P$62 is the detection gain of the head position. The magnetic disk apparatus that is being discussed is presumed to have the following parameters: Track Pitch= 7000 tracks/inch (TPI), Sample Times Ts=150 $\mu$s, Multirate Sample Times (dividing Ts into four) Tss=37.5 $\mu$s.

In the following, using a numeric expression, a method of generating the multirate feedforward controller function 77 and the target position trajectory function 72 according to the present invention will be explained in detail. In formula (1), a controlled object of the head positioning mechanism system of a magnetic disk apparatus in continuous time is described. It is modeled here in duplex integration to make speech concise.

$$P(s) = \frac{k}{s^2} \quad (1)$$

wherein "k" it is the loop gain for a controlled object, which can be calculated based on the conversion gain of the D/A converter 66, the gain $K_A$ 68 of a power amplifier, the thrust gain $K_F$ 69 of a voice coil motor and the inertia mass M 60. When the above formula (1) is discretizationed by sample time Tss, the controlled object of a discrete system is represented by the formula (2).

$$P(z^{-1}) = k_d \frac{z^{-1}(1+z^{-1})}{(1-z^{-1})^2} \quad (2)$$

However, $$k_d = k \frac{T_s^2}{2} \quad (3)$$

$$G(z^{-1}) = \frac{z^{-d}B(z^{-1})}{A(z^{-1})} \quad (4)$$

The formula (4) represents a delay of one step and represents an operator that is made to do tardiness of time TSS. The numerator polynomial of the formula (2) is a stable limit, and the reverse dynamic number of the numerator polynomial becomes unstable. Therefore, a controlled object is discretizationed simply, and the reverse dynamics cannot be composed to multirate feedforward controller 77.

This will be explained by generalizing a controlled object to explain a design of the multirate feedforward controller 77 here. A general discreteness time controlled object is represented by the next formula (5).

The unit delay operator $$z^{-1} \quad (5)$$

However, $$A(z^{-1}) = 1 + a_1 z^{-1} + \ldots + a_n z^{-n} \quad (6)$$

$$B(z^{-1}) = b_0 + b_1 z^{-1} + \ldots + b_m z^{-m} \quad (7)$$

Then, the numerator polynomial of the formula 5 is divided into two parts including a stable polynomial and an unstable polynomial.

$$B(z^{-1}) = B_a(z^{-1}) B_u(z^{-1}) \quad (8)$$

However,

The dimension (m-s) polynomial $B_a(z^{-1})$: that makes stable zero point a root. (9)

The dimension s monic polynomial $B_u(z^{-1})$: that makes unstable zero and stable marginal zero a root. (10)

However, $$B_u(z^{-1}) = b_{u0} + b_{u1} z^{-1} + \ldots + b_{us} z^{-s} \quad (11)$$

The next formula (12) represents a reverse system with only a stable zero point to avoid zero erasure on an unstable polynomial.

$$F_1(z^{-1}) = \frac{A(z^{-1})}{B_a(z^{-1}) B_u(1)} \quad (12)$$

In addition, the next formula is calculated based on a polynomial with an unstable zero point.

$$B_u^*(z^{-1}) = z^{-s} B_u(z) = b_{us} + b_{u(s-1)} z^{-1} + \ldots + b_{u0} z^{-s} \quad (13)$$

Multirate feedforward controller 77 is represented by the next formula which is obtained by using the formula (12) and the formula (13).

$$F_2(z^{-1}) = \frac{A(z^{-1}) B_u^*(z^{-1})}{B_a(z^{-1}) \{B_u(1)\}^2} \quad (14)$$

And, there is a feature of the present invention involving the use of a future value of a target position trajectory to which only the (s+d) step advanced target position trajectory 82 is substituted for the above multiple rate feedforward controller. The (s+d) step converted into time becomes time Tf=Tss·(s+d), and it advances only time Tf in block 75. This step implements sampling by multirate sample time Tss (76) and substitution for multirate feedforward controller 77. As a result, the relation from target position trajectory yd(k)82 to control output y(k)94 is represented by the following:

$$y(k) = \frac{z^{-d} B(z^{-1})}{A(z^{-1})} \cdot \frac{A(z^{-1}) B_u^*(z^{-1})}{B_a(z^{-1})\{B_u(1)\}^2} yd(k+s+d) \quad (15)$$

$$= \frac{B_u(z^{-1})}{B_u(1)} \cdot \frac{B_u^*(z^{-1})}{B_u(1)} yd(k+s)$$

$$= \frac{B_u(z^{-1})}{B_u(1)} \cdot \frac{B_u(z)}{B_u(1)} yd(k)$$

The frequency characteristics of the formula (15) is as follows. However, in formula (16), Tss=T.

$$[B_u) e^{-jwT})/B_u(1)][B_u(e^{jwT})/B_u(1)] = [\text{Re}(w) - j\text{Im}(w)][\text{Re}(w) + j\text{Im}(w)]$$

$$= \text{Re}(w)^2 + \text{Im}(w)^2 \quad (16)$$

However, $$\text{Re}(w) = \frac{b_{u0} + b_{u1} \cos(wT) + \cdots + b_{us} \cos(swT)}{b_{u0} + b_{u1} + \cdots + b_{us}} \quad (17)$$

$$\text{Im}(w) = \frac{b_{u0} + b_{u1} \sin(wT) + \cdots + b_{us} \sin(swT)}{b_{u0} + b_{u1} + \cdots + b_{us}} \quad (18)$$

The formula (16) does not have a complex part. This characteristic of the formula (16) means that there is no change of phase at all frequencies. In the low frequency area on the formula (16), the COS function can approximate 1 and the SIN function can approximate 0. Therefore, it is understood that the gain of the formula (16) approaches 1.

The next formula (19) is composed according to the formula (14) for the multirate feedforward controller with respect to the controlled object of the magnetic disk apparatus described in the formula (2).

$$F_3(z^{-1}) = \frac{A(z^{-1})}{k_d} \frac{B_u^*(z^{-1})}{[B_u(1)]^2} = \frac{A(z^{-1})}{k_d} \frac{(1+z^{-1})}{4} \quad (19)$$

In this case, the (s+d) step is performed in two steps. Therefore, the target position trajectory uses the future value yd(k+2) advanced by two steps. As a result, the relation between target position trajectory yd(k) and head position y(k) is represented by the formula (20).

$$y(k) = k_d \frac{z^{-1}(1+z^{-1})}{A(z^{-1})} \cdot \frac{A(z^{-1})}{k_d} \frac{(1+z^{-1})}{4} yd(k+2)$$

$$= \frac{(1+z)(1+z^{-1})}{4} yd(k) \quad (20)$$

In the formula (20), as explained above, the phase characteristics become constant with respect to frequency, and the gain characteristics is reduced a little in the high-frequency area. Therefore, if the controlled object is moved with a high frequency, the head cannot follow the target position trajectory closely. However, an answer is favorable for which the phase characteristics perfectly correspond with a target trajectory.

The procedure for designing a target acceleration trajectory will be described in detail by reference to the flow diagram of FIG. 9 later. And, the calculation of a multirate controller can be calculated while the head is operating. In this case, the calculation result of the multirate controller is stored in memory 84 in advance as a target acceleration trajectory of a discrete system.

On the other hand, the feedback control system that secures the stability of the control system uses the following controller 63 at the time of a following operation in the conventional system. For example, it uses a read lag filter or a PID filter, etc. Gb 64 sets the zero cross frequency of an open-loop system to a designated frequency, for example, 500 HZ. And, to deny external force 70, Gb 64 adds a presumption value 65 of the external force determined in advance depending on the track position. The target position trajectory 79 of the discrete system that is stored in a memory in advance is obtained by sampling 74 during the sampling period Ts from the target position trajectory in the continuous system 72 delayed only by a time TM. A time TM is defined as a time period which includes a time delay and the calculation time delay Td. The time delay is equal to phase the tardiness of the notch filter and a power amplifier, and the calculation time delay Td is shown in FIG. 2.

The reverse model of the stable discrete system of the controlled object 60 can be constructed by making only a time Tf advance to a multirate feedforward controller 77 and target position trajectory. Even if the delay of another block, that is a total delay time Tm, which is the sum of the calculation time delay Td and each delay time of the notch filter 67 and the power amplifier 68, exists, the head position 72 can follow the target position trajectory 82 accurately according to the delay time Tm relative to the target position trajectory by the following controller 63.

A controlled object was explained as an inertia field in this embodiment in the design of a multirate feedforward controller 77. However, even if a controlled object represented by a continuous system in the formula (21) becomes discrete, it is possible to design the multirate feedforward controller 77. And, the target position trajectory uses a two steps future (predicted) value.

$$Ps = \frac{k}{s^2} e^{-T_d s} \quad (21)$$

In this case, a time delay represented by the delay element Tm of block 73 may be set equivalent to the phase tardiness of the notch filter 67 and the power amplifier 68.

And, in the design of multirate feedforward controller 77, a control object can be composed as an inertia field and a mechanical resonance. In this case, it is possible to design the target trajectory such that, at a minimum, it represses any influence due to the vibration of mechanical resonance. And, it can be combined with the frequency characteristics of a voice coil motor and the frequency characteristics of a notch filter.

Figure 5:
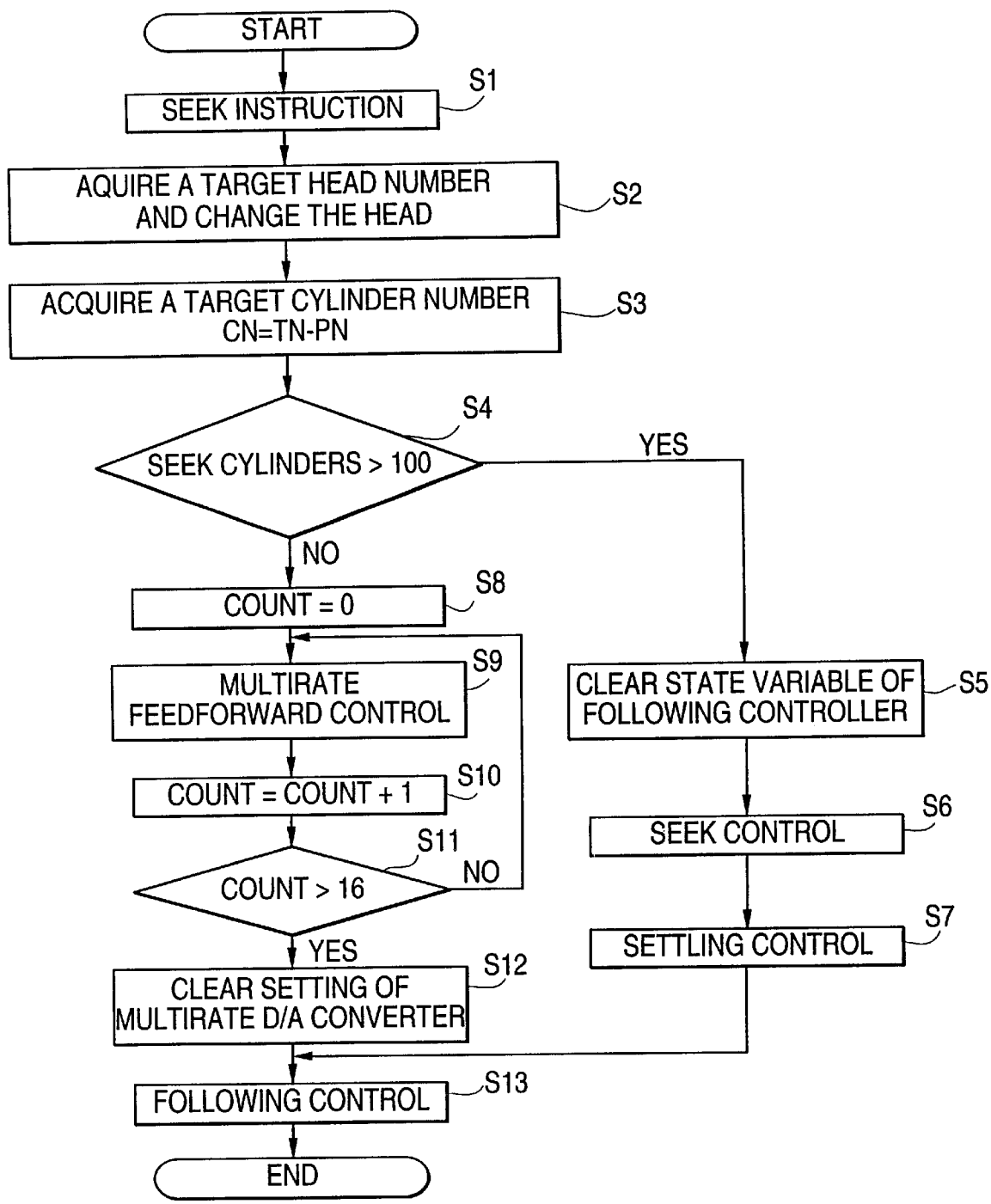
FIG. 5 is a flowchart that shows the procedure for seek control according to present invention.

FIG. 5 is a flowchart of the overall seek process to show a procedure for executing multirate feedforward control in an example of the present invention.

First, a seek instruction is received from a high-ranking controller. (Step S1) Next, the target head number is acquired and the head is changed. (Step S2) The target cylinder number is acquired. The gap between a target cylinder number (TN) and a present cylinder number (PN) is calculated and the cylinder number (CN) to move the head is calculated based on the gap. (Step S3) In case the cylinder number (CN) is 100 tracks or more, the following steps are traced. (Step S4) The state variable of following controller 63 is cleared to zero. (S5) Head moves to the target track neighborhood by ordinary seek control. (S6) Then, the control mode is changed into ordinary settling control. (S7) After a head settles on the target track, the control is changed into ordinary following control. (S13) On the other hand, the function of a sample counter COUNT is cleared to zero in the case where the moving cylinder is 100 tracks or less in Step S4. After that, the multirate feedforward control is executed. (Step S9) This execution will be explained in detail later with reference to FIG. 6.

Next, the sample counter counts up by one (Step S10) The multirate feedforward control (S9) is implemented until the sample counter reaches 16. (Step S9) The multirate D/A converter is cleared when a sample counter is at 17. (Step S12 ) At this time, the control shifts to ordinary following control because the feedforward trajectory and the target position trajectory become zero. (Step S13)

When the processing passes to the multirate feedforward control (Step S9) of the present invention, care is taken not to clear the state variable of the following controller to zero. According to this feature, the controller of the present invention is especially strong to an external force of constant value.

Figure 6:
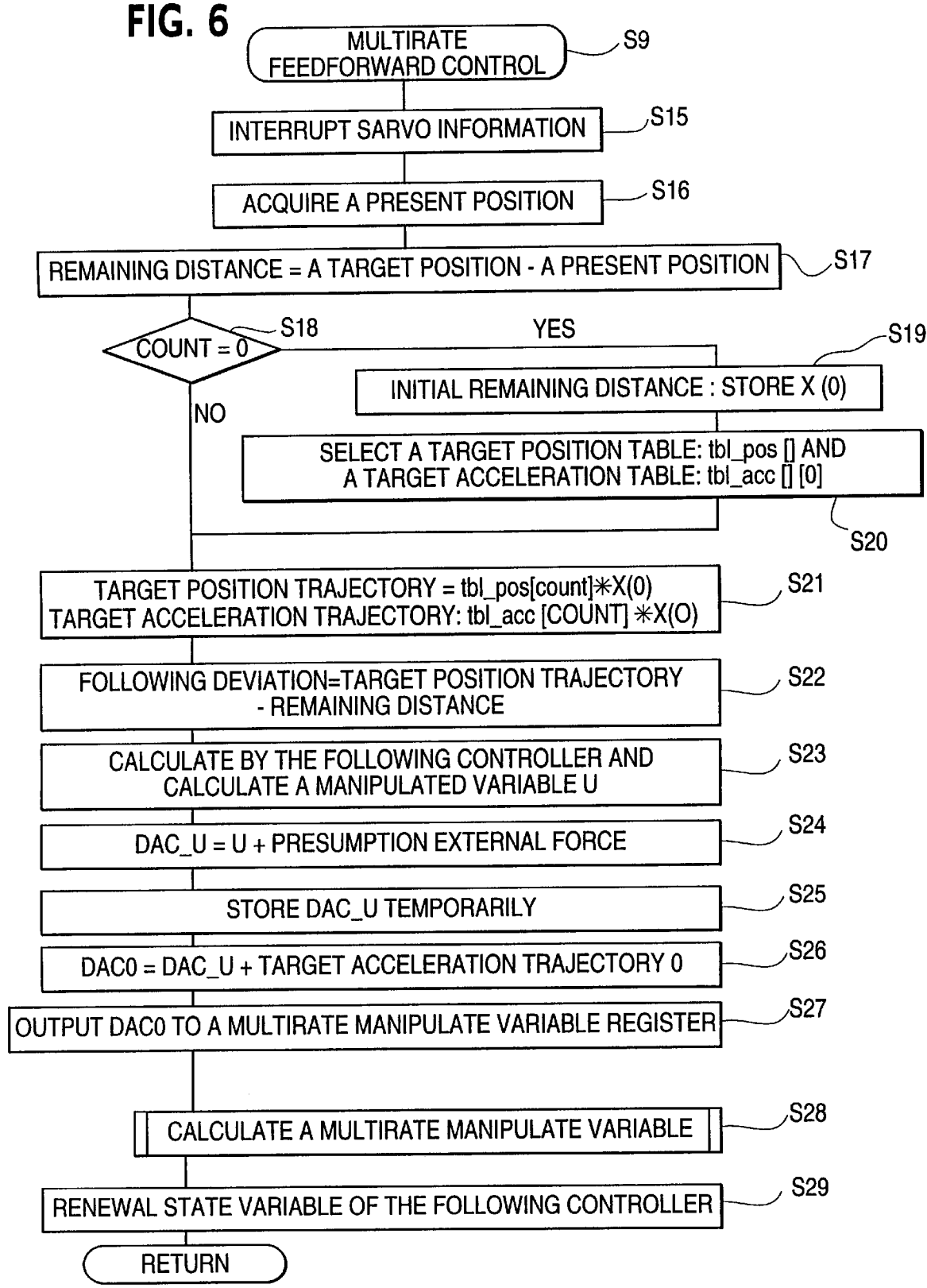
FIG. 6 is a flowchart that shows the procedure for multirate feedforward control.

FIG. 6 is the detailed flowchart of the multirate feedforward control that is shown in step S9 of FIG. 5. The steps from step S15 to step S27 corresponds to microprocessor operation processing 39-1 of FIG. 2, and the steps from step S15 to step S27 corresponds to operation processing 39-2 of FIG. 2.

First, the interruption flag for the servo information occurs in step S15. And then, a present position signal is acquired by the A/D converter in step S16. The deviation from the target position to the present position is calculated as the remaining distance (Step S17). When step counter COUNT is 0 in step S18, the remaining distance is stored in a memory as an initial remaining distance:X(O) (Step S19). The target position trajectory table: tbl_pos 83 and the target acceleration trajectory table: tbl-acc 84 are selected. Each table is in the discrete system and corresponds to the moving cylinder (step S20).

Table 83 of the target position trajectory that is used for a seek operation for 16 cylinders and table 84 of a target acceleration trajectory are shown as an example in FIG. 14. The method of creating the table will be explained in detail later by reference to FIG. 9. It should be noted that the target position table shows the function of step counter COUNT that corresponds to a sample time Ts, and that the target acceleration table shows the function of step counter COUNT and multirate counter MCOUNT that corresponds to multirate sampling time Tss. In FIG. 14, the step counter COUNT is from 0 to 15. The multirate counter MCOUNT is from 0 to 3 because a multirate sample time is the result of dividing the ordinary sample time into four in this embodiment.

In step S21, the target position trajectory that corresponds to COUNT is calculated, and the target acceleration trajectory 0 that corresponds to COUNT and MCOUNT=0 is calculated. The target position trajectory is calculated using the formula "tbl_pos [COUNT] * X(0)". Target acceleration trajectory 0 is calculated using the formula "tbl_acc [COUNT] [MCOUNT=0 1 * X(0) * gain adjustments". The gain adjustment is such that the gain of the voice coil motor that depends on a track position is a multiple of the gain that denies a fluctuation of the voice coil motor gain.

In step S22, the deviation of a calculated target position trajectory and remaining distance is calculated, and a following deviation signal 98 is calculated. This following deviation signal 98 is compromised by the following controller 63, and the manipulated variable U95 is calculated (S23). Following controller 63 has a phase advance/delay compensation and a PID compensation, etc.

Then, manipulated variable U is added presumption external force 65, and DAC_U96 is calculated (step S24). Presumption external force 65 is required in advance for each track by a disturbance observer, etc. In step S25, DAC_U96 is stored in a temporary memory. In step S26, a first manipulated variable DAC0 is calculated by the addition of DAC_U and the target acceleration trajectory 0:80. Then, DAC0 is output to the multirate manipulated variable register 22 (step S27). In step S28, the second, the third and the fourth manipulated variables that are set at multirate D/A converter 66 are calculated. This flow of the calculation for the second, the third and the fourth manipulated variable will be explained in detail with reference to FIG. 7. Lastly, in step S29, the state variable of a following controller is renewed.

Figure 7:
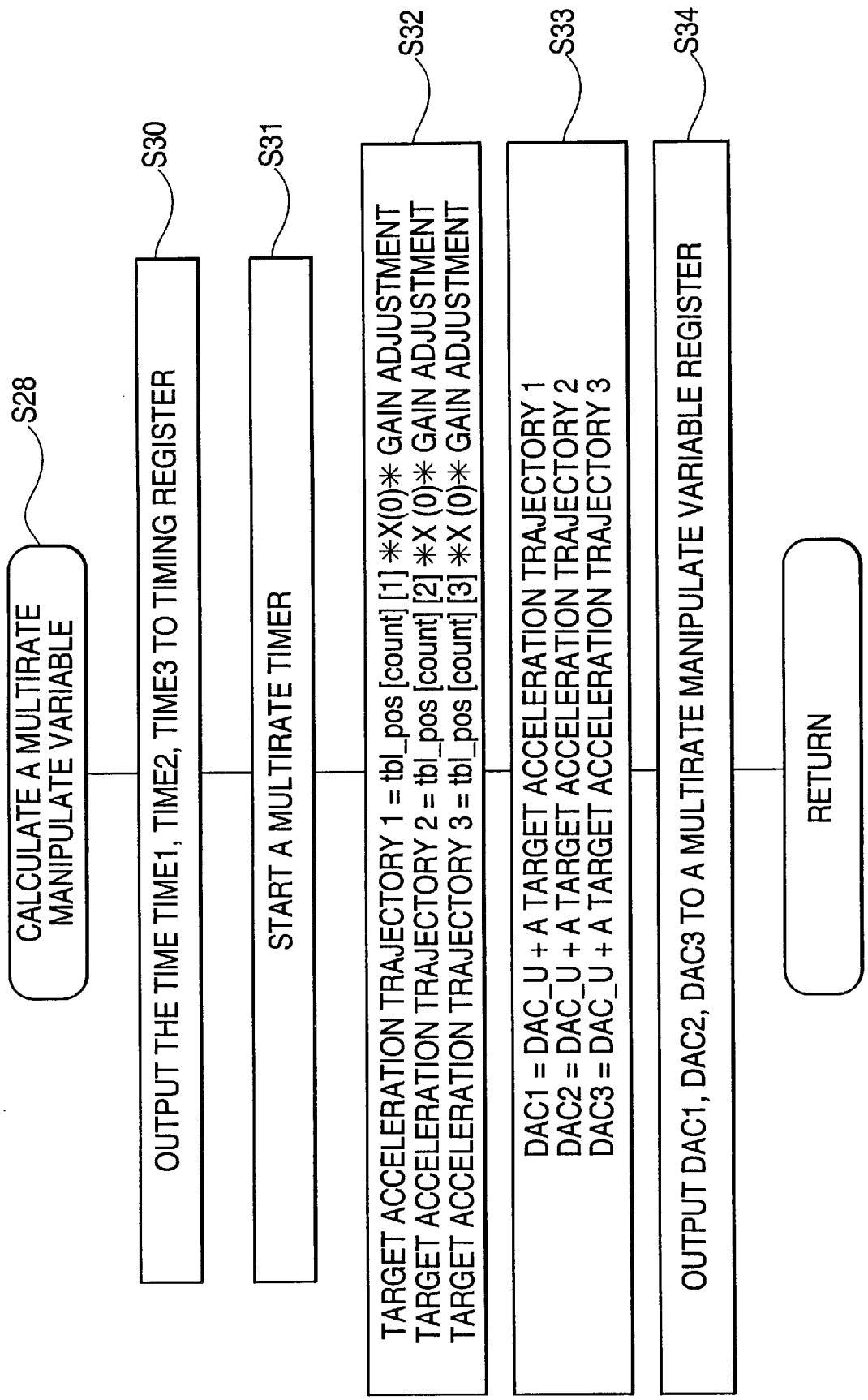
FIG. 7 is a flowchart that shows the operation of the manipulated variable that is set at a multirate D/A converter.

FIG. 7 shows the flowchart that explains the second, the third and the fourth manipulated variables that are set in multirate manipulated variable register 22, as provided in step S28 of FIG. 6.

First, in step S30 multirate setting times:TIME1, TIME2 and TIME3 are output, and the multirate setting time is set in timer register 21 of multirate setting system 27. The time determination method was described before. Then, multirate timer flag 38 as explained in reference to FIG. 2 is started (step S31). In the same way as multirate counting MCOUNT=0, "the target acceleration trajectory 1=tbl_acc [COUNT] [MCOUNT=1] * X(0) * gain adjustment" is calculated. "The target acceleration trajectory 2=tbl_acc [COUNT] [MCOUNT=2] X(0) * gain adjustment" is calculated. "The target acceleration trajectory 3 tbl_acc [COUNT] [MCOUNT=3] * X(0) * gain adjustment" is calculated (step S32). In step S33, each of the target acceleration trajectories 1, 2 and 3 is added to DAC_U:96 calculated above. And, a second manipulated variable DAC1, third manipulated variable DAC2 and fourth manipulated variable DAC3 are calculated. Lastly, in step S34, DAC1, DAC2 and DAC3 are output to manipulated variable register 22 of the multirate setting system. By the above procedure, the second, the third and the fourth manipulated variables DAC1, DAC2 and DAC3 calculated by a multirate feedforward controller and a following controller can be output from the D/A converter 30 at the predetermined times TIME1, TIME2 and TIME3.

Figure 8:
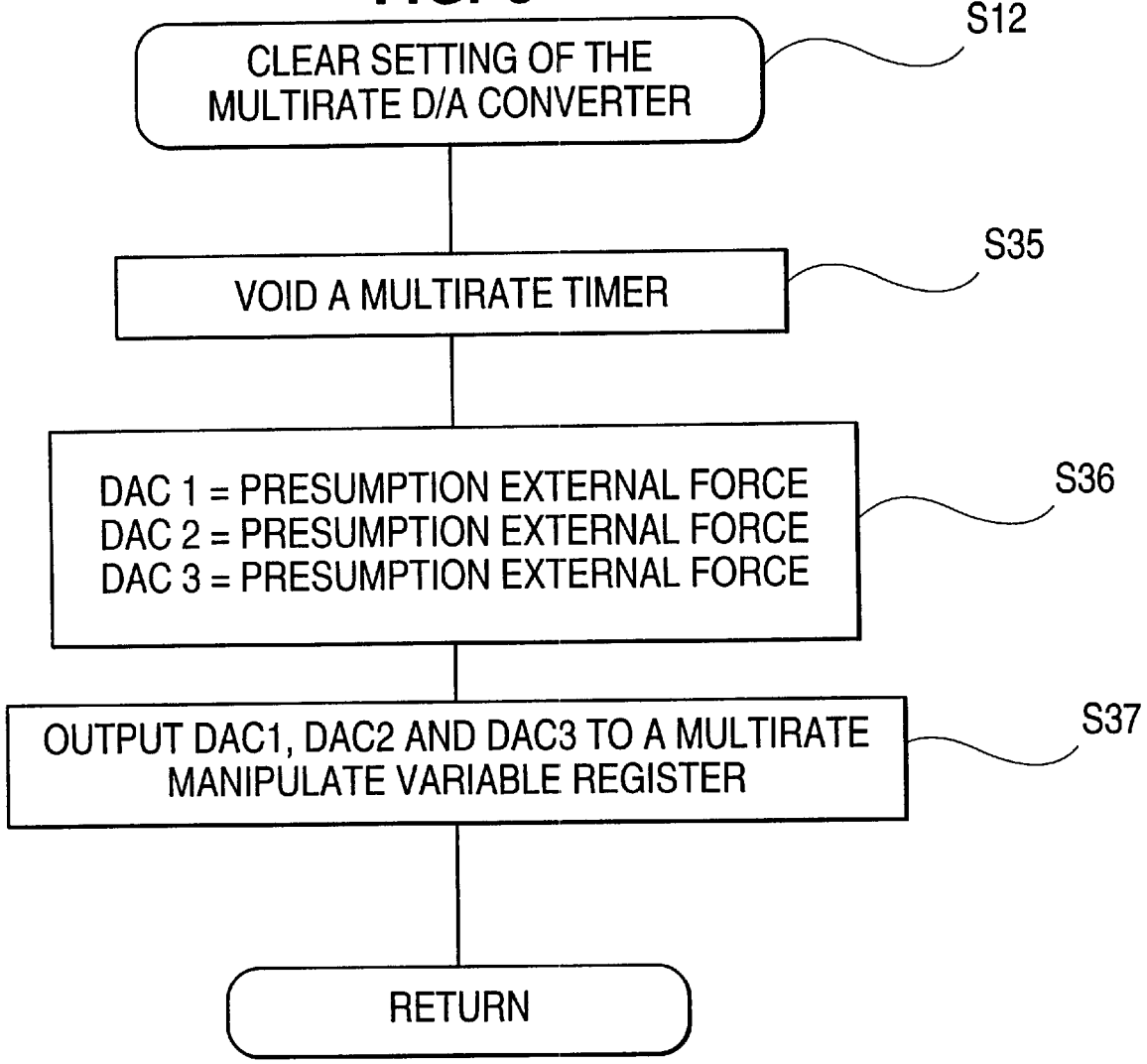
FIG. 8 is a flowchart that shows a procedure for clearing the setting of the multirate D/A converter.

FIG. 8 is a flowchart of the procedure in which the setting of multirate D/A converter shown in step S12 of FIG. 5 is cleared.

The process of making the timer of the D/A converter invalid is executed (step S35), then, DAC1, DAC2 and DAC3 are set to the value of a presumed external force respectively (S36) and a manipulated variable register value is output (step S37). This is to prevent the circuit, during an incorrect operation, from outputting an excessive manipulated variable during a following operation.

When the feedforward control system that follows a target trajectory is designed, the design of the waveform used for tracking the target trajectory is important. The symmetrical triangular waveform for acceleration and deceleration, the waveform of a sine wave, the smooth waveform of minimized energy, etc. have been. In accordance with the present invention, it is proposed that the target acceleration trajectory have an acceleration trajectory which is controlled using a trapezoidal wave, a deceleration trajectory controlled using a trapezoidal wave, and a trajectory for positioning at the target position controlled by an exponential function. This positioning control tracing on the target acceleration does not change the control mode.

Figure 9:
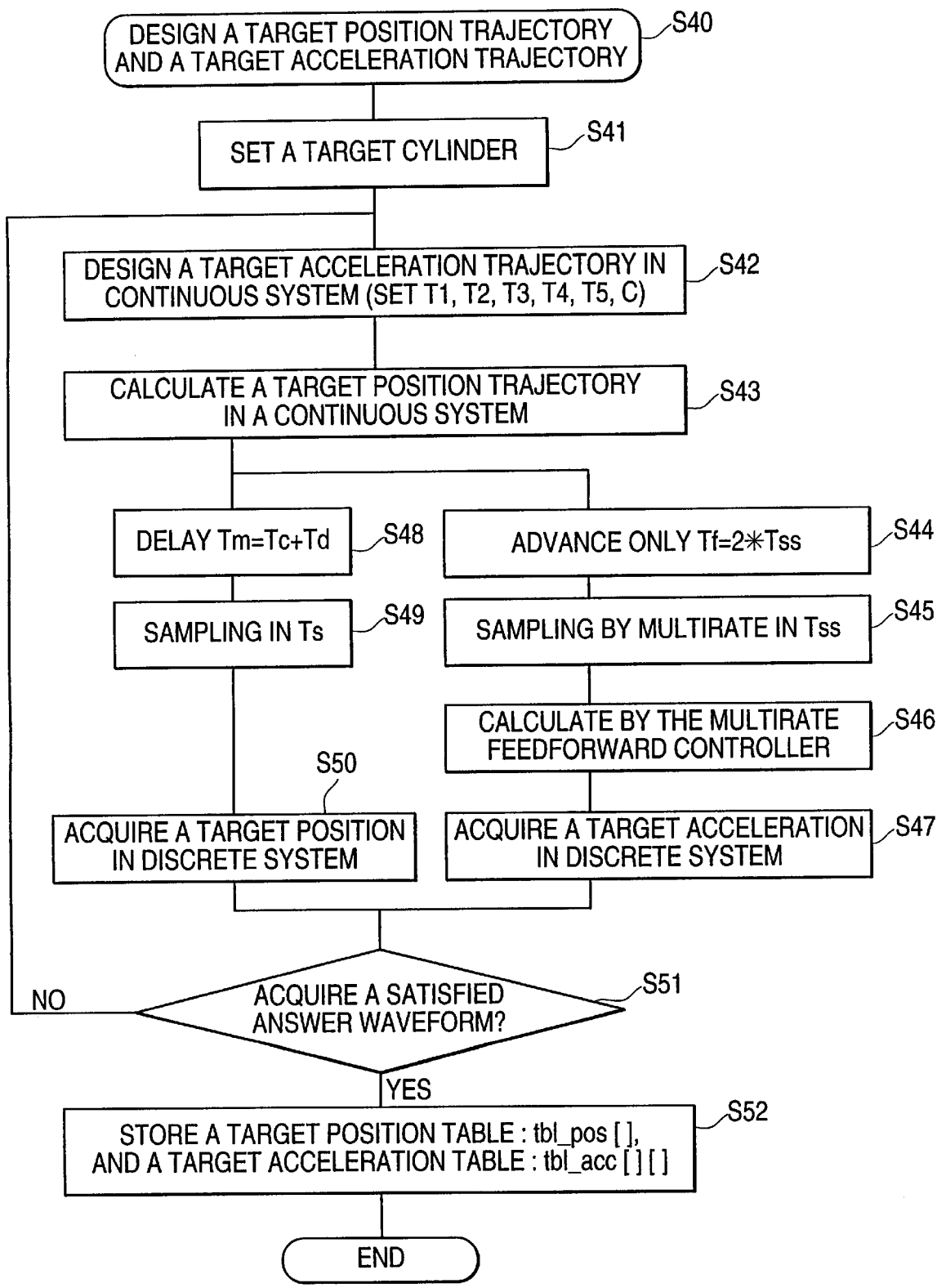
FIG. 9 is a flowchart that shows a procedure for designing a target position trajectory and a target acceleration trajectory.

FIG. 9 is the flowchart that shows an example of a procedure for designing a target position trajectory according to the present invention and a target acceleration trajectory.

This flowchart shows a procedure to derive the target position trajectory 83 and the target acceleration trajectory 84 of a discrete system in FIG. 4. Especially, it is to be noted that block 75 corresponds to step S44 and that block 73 providing a time Tm delay corresponds to step S48. And, table 83 of a target position trajectory required here and table 84 of a target acceleration trajectory are used for the calculation of the target position trajectory and the target acceleration trajectory shown in step S21 of FIG. 6 and step S32 of FIG. 7. The target position trajectory and the target acceleration trajectory can be calculated during head movement. Next, the way that the target position trajectory and the target acceleration trajectory are obtained in advance and are stored as a table will be explained.

First, the target cylinder is set (step S41). Then, the target acceleration trajectory of the continuous system is designed (step S42). This process of the design is shown from the following formula (22) to the formula (26). The target acceleration trajectory acquired by this process has a trapezoidal acceleration and a trapezoidal/exponential function deceleration. The designer sets the time T1, T2, T3 and T4 and T5 and an exponent part C of an exponential function.

$$0 < t \leq T_1 \qquad (22)$$
$$a_1(t) = \frac{a_{max}}{T_1} t$$

$$T_1 < t \leq T_2 \qquad (23)$$
$$a_2(t) = a_{max}$$

$$T_2 < t \leq T_3 \qquad (24)$$
$$a_3(t) = \frac{a_{min} - a_{max}}{T_3 - T_2}(t - T_2) + a_{max}$$

$$T_3 < t \leq T_4 \quad (25)$$
$$a_4(t) = a_{\min}$$

$$T_4 < t \leq T_5 \quad (26)$$
$$a_5(t) = a_{\min} e^{-\frac{1}{e}(t-T_4)}$$

Maximum acceleration AMAX and minimum acceleration AMIN of above formulas are calculated so that the target speed becomes zero in the time T=T5, and so that the target position reaches the predetermined target cylinder.

Then, in step S43, the above formulas are double integrated, and the target position trajectory of the continuous system is calculated. Only two steps are required to make this target position trajectory advance. The multirate sample time becomes Tss=Ts/4, because the sample time Ts of the multirate processing is divided by four uniformly. Therefore, the target position trajectory advances only by time Tf=2×Tss. After the above mentioned target position trajectory is sampled by Tss in step S45, the calculation of the formula (14) by multirate feedforward controller 77 is executed by sample time Tss in step S46. Consequently, the target acceleration trajectory of the discrete system is acquired (S47).

On the other hand, in step S48, the target position trajectory of a continuous system, is delayed by the time Tm. The time Tm is added to the calculation time delay Td and the time delay Tc equivalent to the phase delay of the voice coil motor and the notch filter. The delayed target position trajectory is sampled in the sample time Ts in step S49. And, the target trajectory of the discrete system is acquired in step S50.

In step S51, after the feedforward control is executed by the acquired target acceleration trajectory and the target position trajectory, the response waveform is checked to see whether that waveform is sufficient or not. When it is proved that the response of a head vibrates and/or the target trajectory is designed beyond the ability of the voice coil motor, the process returns to step S42 again, and a design of the target acceleration trajectory of a continuous system is done again. When a satisfactory response waveform is obtained, the processing shifts to step S52, and the target position table tbl_pos [ ] and the target acceleration table tbl_acc [ ] [ ] are stored.

Figure 10:
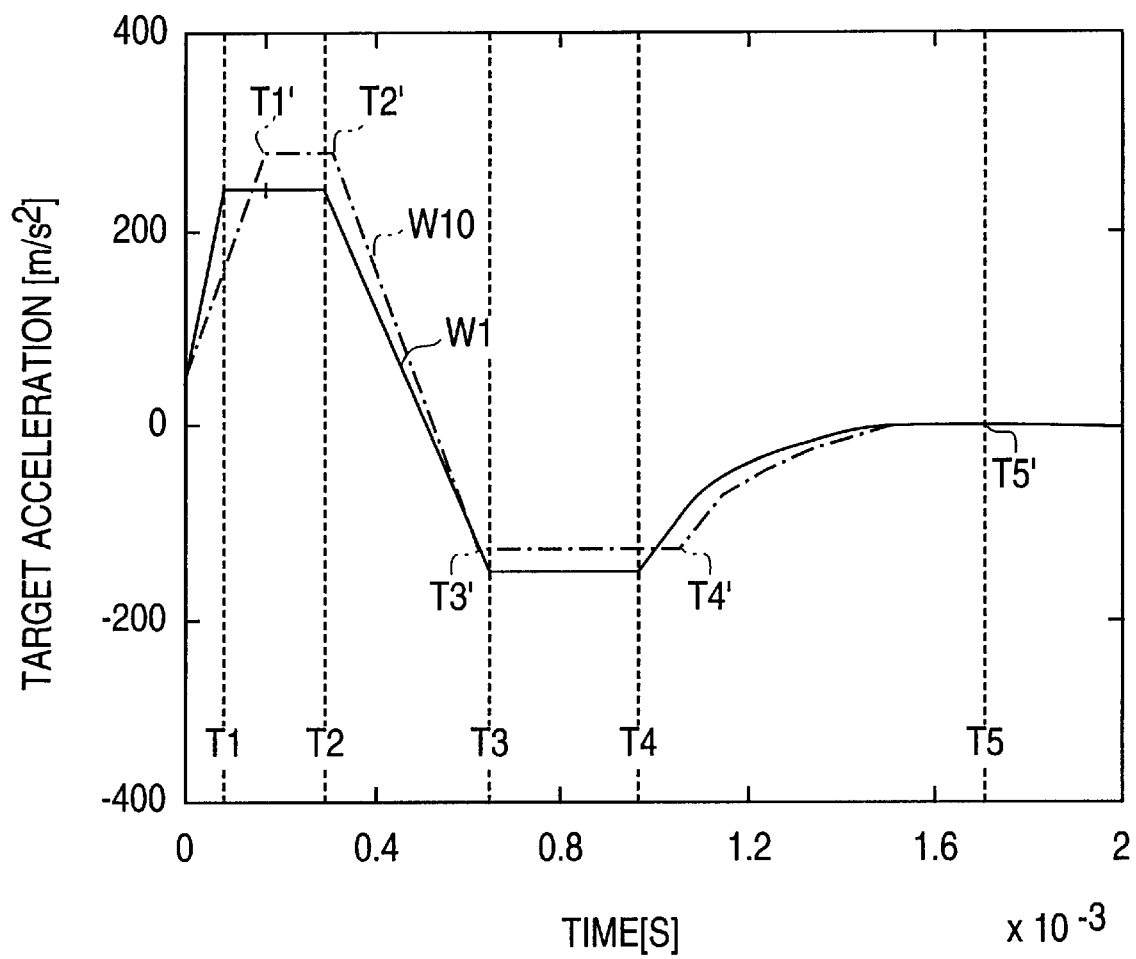
FIG. 10 is a characteristic diagram which shows an answer waveform that is obtained in step S42 of FIG. 9.

The solid line of FIG. 10 shows an example of the target acceleration trajectory of the continuous system that is obtained in step S42 of FIG. 9 for 16 cylinders in this embodiment a target cylinder.

Figure 11:
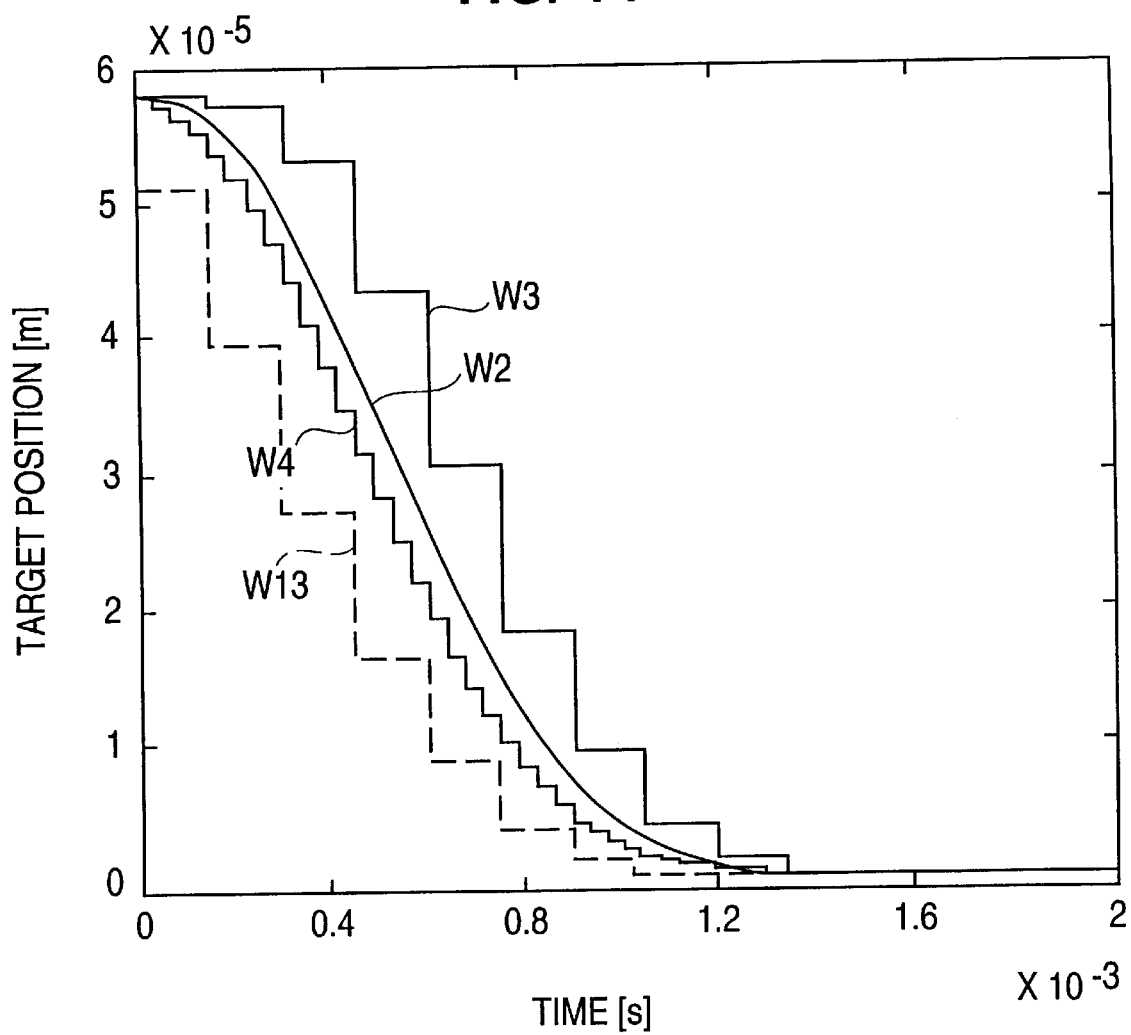
FIG. 11 is a characteristic diagram which shows an answer waveform that is obtained in step S43, step S45 and step S49 of FIG. 9.

It is possible for the target acceleration to be designed in detail, because the multirate sample time Tss can be set in the time from T1 to T5 as a minimum cut time on the execution of the multirate control by using target acceleration W1. The line W2 in FIG. 11 shows the target position trajectory of the continuous system that is acquired by double integrating these times in step S43 of FIG. 9. The line W3 in FIG. 11 shows the target position trajectory obtained in step S50 of FIG. 9 and the line W4 in FIG. 11 shows the trajectory obtained in step S45 of FIG. 9. This will be understood by considering in FIG. 11 that W3 is the time Tm behind relative to W2 and that W4 is the time Tf advancing relative to W2.

Figure 12:
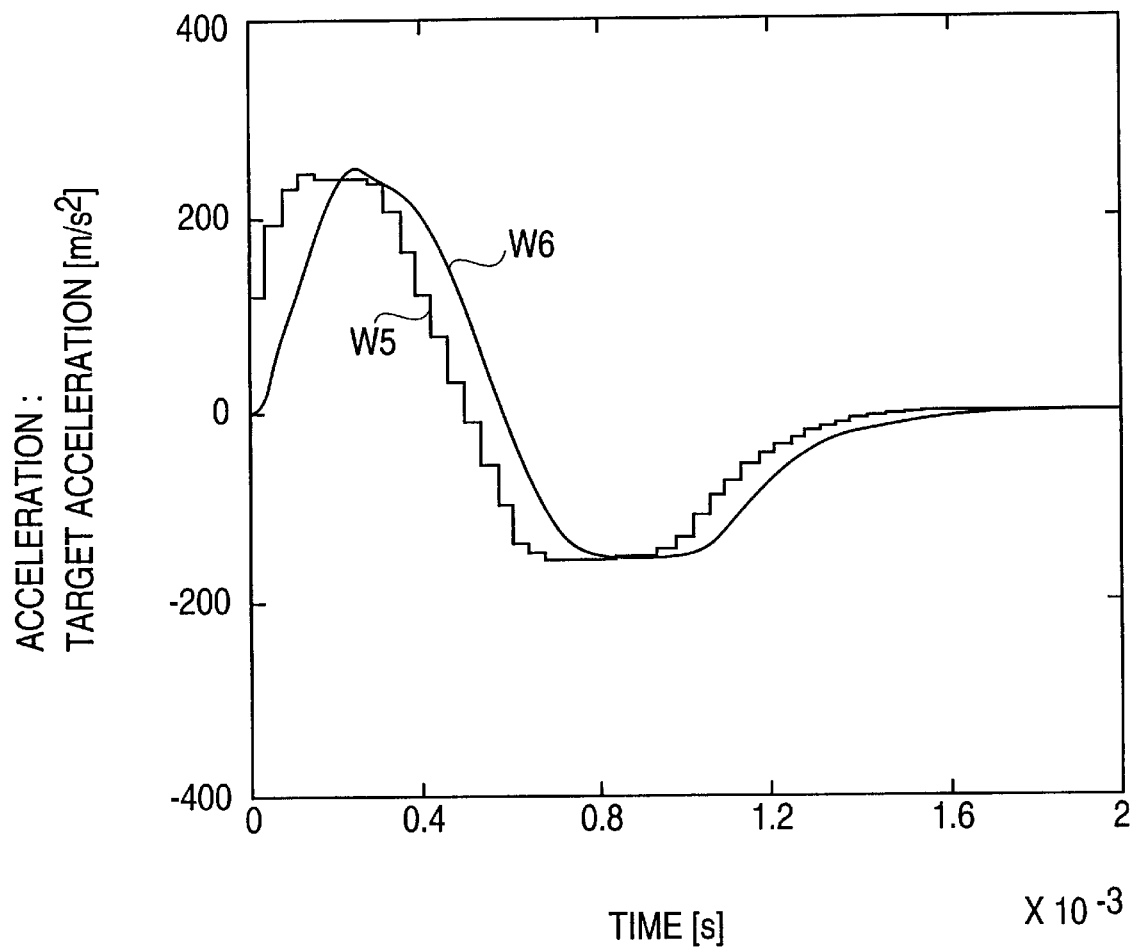
FIG. 12 is a characteristic diagram which shows an answer waveform that is obtained in step S47 of FIG. 9.

W5 shown in FIG. 12 is a target acceleration trajectory obtained in step S47 of FIG. 9. On the other hand, W6 is the response waveform of the continuous system of head acceleration when a head is moved 16 tracks in the structure shown in FIG. 4. While the target acceleration trajectory W5 is made to advance two samples in step S44, when this target acceleration trajectory W5 is delayed two samples, it will be understood that the head acceleration corresponds to the delayed target acceleration trajectory by comparing the delayed acceleration with the response waveform of the head acceleration.

Figure 13:
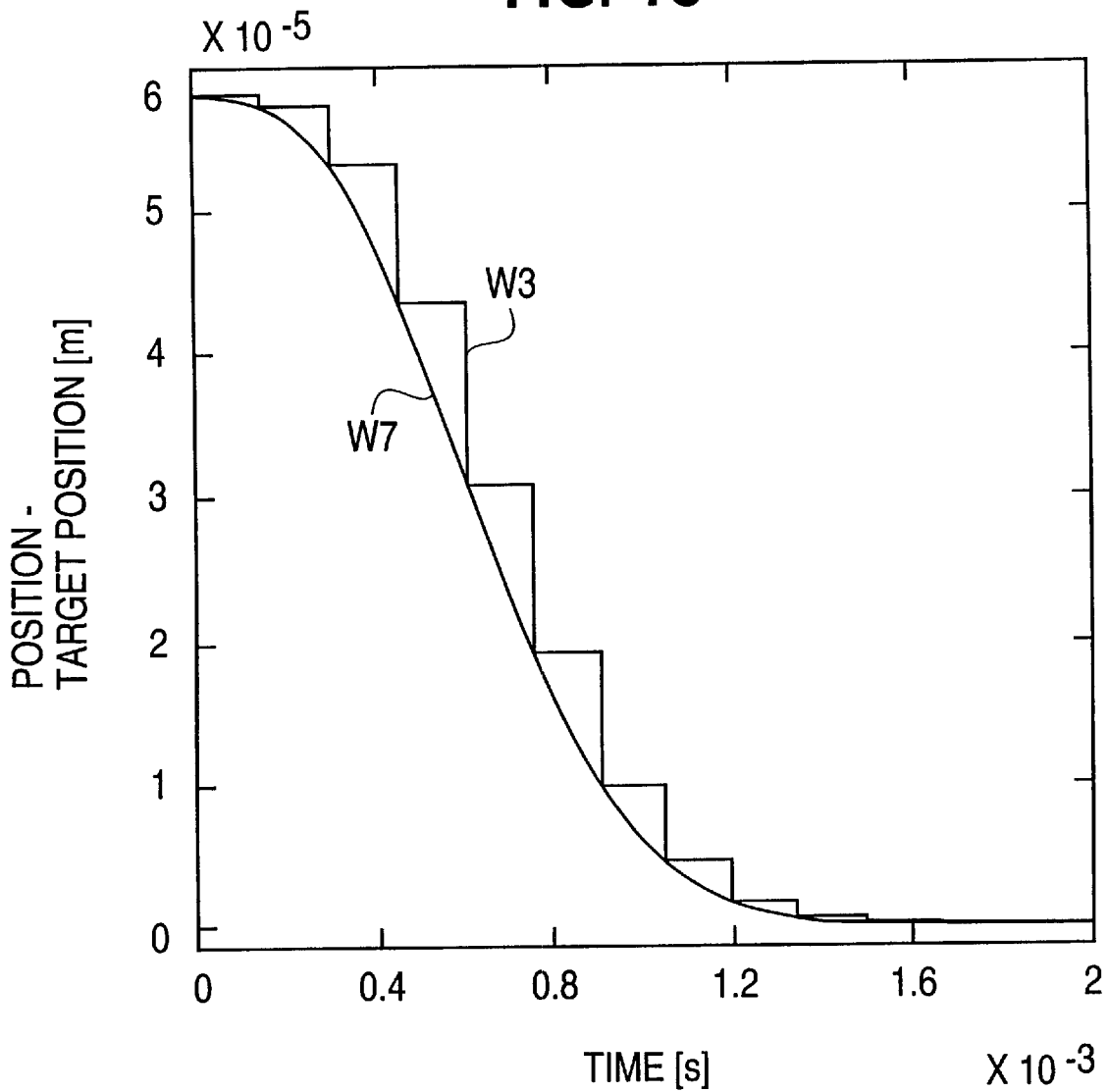
FIG. 13 is a characteristic diagram which shows an answer waveform that is obtained in step S50 of FIG. 9.

On the other hand, W3 shown in FIG. 13 is a target position trajectory obtained in step S50 of FIG. 9 and the same waveform as W3 of FIG. 11. W7 is the response waveform of a head position represented in the continuous system when a head is moved 16 tracks in the structure that is shown in FIG. 4. In FIG. 13, the target position trajectory obviously corresponds to the head position, and so the validity of a present invention can be confirmed.

FIG. 14 is a table that represents the numerical value data of the target position trajectory table "tbl_pos [ ]" 83 and the target acceleration trajectory table "tbl_acc [ ] [ ]" 84 obtained in step S52 of FIG. 9. The target position table is stored in a memory in standardized form. The target acceleration table is stored as acceleration data itself.

For the head s moving to another track, a new target trajectory can be obtained using the procedure in FIG. 9. While a corresponding target trajectory can be obtained for all tracks, the target trajectory of the representative position of a certain span can be designed, and the movement through the span can be effected by using the target trajectory of the representative position.

Figure 15:
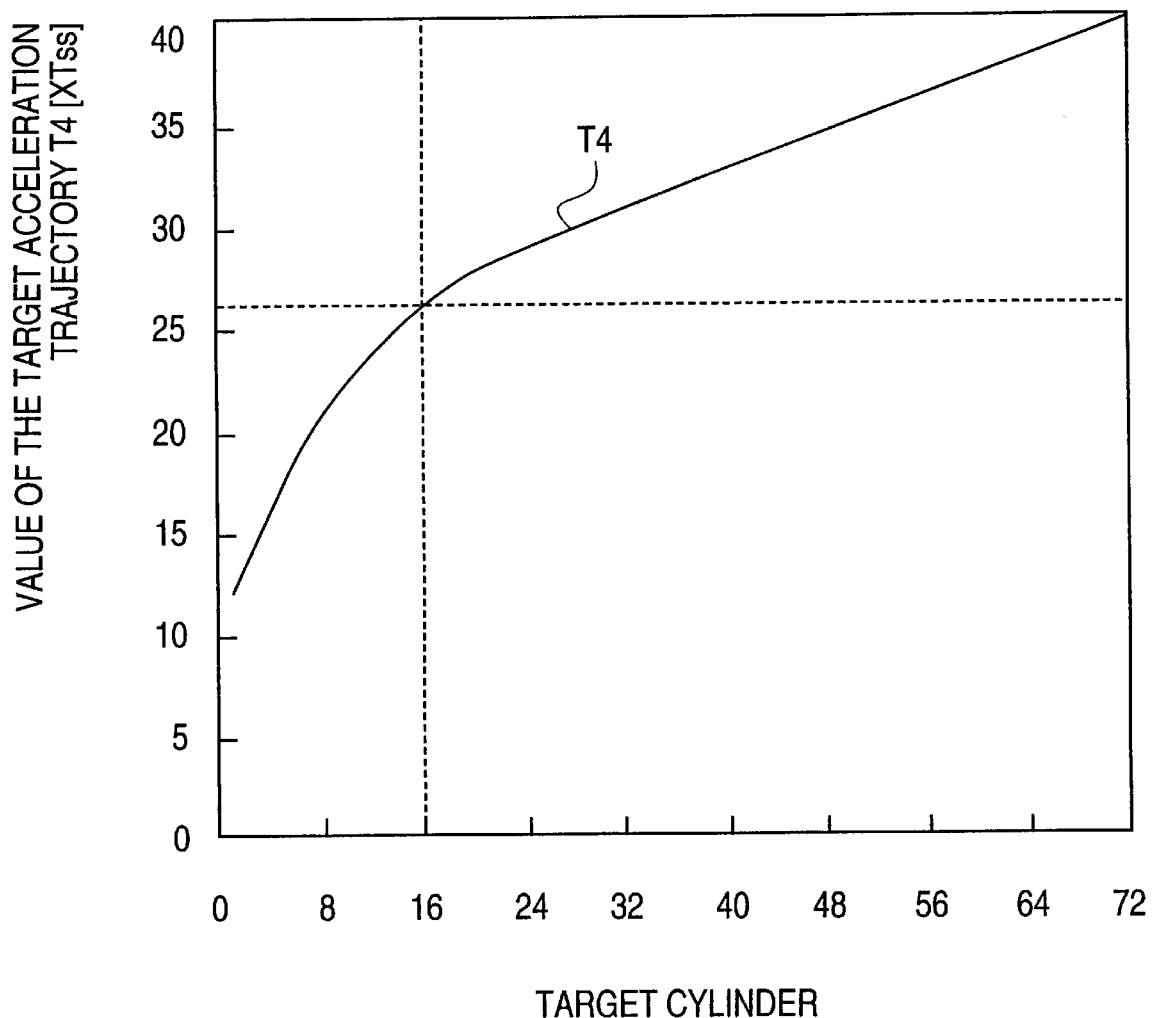
FIG. 15 is a diagram which shows the relationship between a set value of the time T4 of the target acceleration trajectory relative to a target cylinder.

FIG. 15 shows an example of the design of a target acceleration trajectory relative to other tracks. The line T4 in FIG. 15 is an example of the design concerning the target acceleration trajectory that is set in step S42 of FIG. 9, and an example of the set value relative to a target cylinder is being shown. For example, it is understood that "T4=26× Tss=0.975 ms" can be set relative to the 16 cylinders shown in FIG. 10. In FIG. 15, the number of target cylinders is indicated to be 72. In accordance with the present invention, the setting time T1, T2, T3, T4, and T5 of the target trajectory relative to a target cylinder can be set like a route function.

It is obvious that the multirate feedforward controller 77 shown in FIG. 4 can be used as an ordinary single rate feedforward controller operated with a sampling period Ts for all blocks. A single rate D/A converter is used instead of the multirate D/A converter 66 in this case. In FIG. 6, the difference between multirate control and single rate control is that the sample count COUNT is the only function in the target acceleration table "tbl_acc [ ]".

The difference between the flow that determines the target trajectory of a single rate and the flow of FIG. 9 is represented by the following points. Only Tf=2×Ts is made to advance according to step S44 that causes a target position trajectory advance. And, in step S45, sampling occurs in the sample time Ts. In step S46, the calculation of a single rate feedforward control is executed in the sample time Ts. The single rate feedforward control is sufficient in the formula 19.

Dashed line W10 of FIG. 10 is an example of the target acceleration trajectory of a continuous system for 16 cylinders that is used when designing using a single rate feedforward control for a target cylinder. The single rate feedforward control that is shown by dashed line W10 cannot do the fine setting that is shown by solid line W1 of FIG. 10 because the setting time of each target trajectory is a multiple of Ts. But, high-speed head movement can be achieved because of the structure of the single rate feedforward control system of the present invention. This is explained by reference to FIG. 11, FIG. 16 and FIG. 13.

The target trajectory W2 of FIG. 11 requires the target trajectory W1 of a multirate feedforward control in double integration. However, even if the target trajectory W10 of single rate feedforward control is double integrated, its result becomes almost the same value as the target trajectory W2. And, the target position trajectory that is used as a target position of the following controller that is delayed only by the time Tm is the same target position trajectory W3 obtained in the same manner as a multirate processing. The target position trajectory that made only the time Tf advance becomes W13 shown in broken line in FIG. 11. This is the trajectory that is applied to a single rate feedforward controller.

Figure 16:
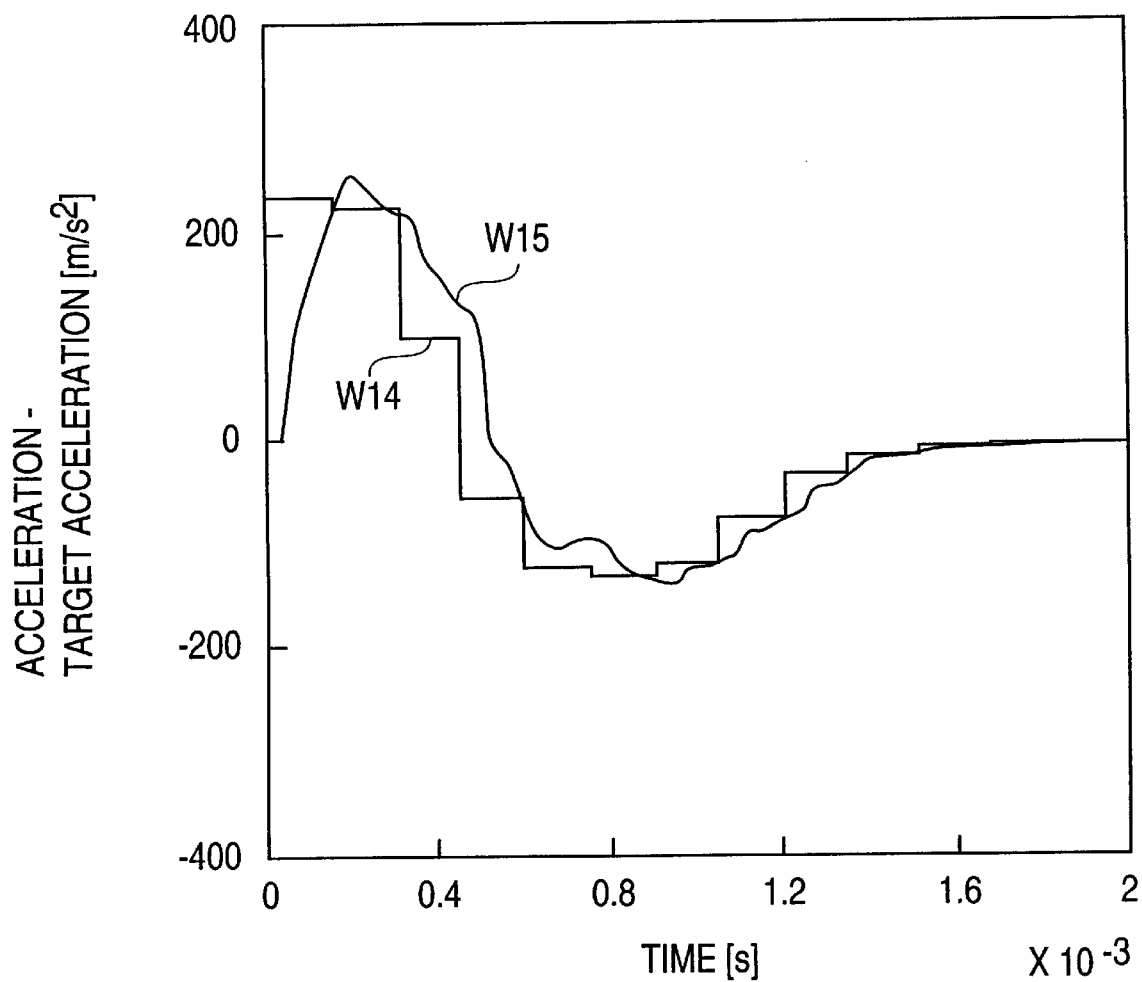
FIG. 16 is a diagram which shows the answer waveform for single rate control in comparison to the waveform of FIG. 10.

The line W14 in FIG. 16 is the target acceleration trajectory that is a result when a single rate feedforward controller is output. And, the line W15 in FIG. 16 is the actual acceleration signal of a head when control is implemented.

Therefore, the movement of a head becomes almost the same as in the case of the multirate control shown in FIG. 13. it is proved that a high-speed transfer of a head according to the present invention can be realized.

This embodiment of the present invention is directed to a magnetic disk apparatus. The present invention, however, can be applied to other cases involving another type of storage medium, for example, an optical disk apparatus. While an embodied numerical value is used in the embodiment mentioned above, it is obvious that the present invention is not restricted to the specified numerical values.

In addition, while, in the embodiment mentioned above, only a feedforward controller operates in the multirate mode in which the trajectory calculation is executed, the present invention is not limited to only a feedforward controller for a multirate process. For example, the trajectory can be calculated in the multirate mode by the following controller 63 and it is possible that seek control and settling control of the type conventionally used also can be used in the multirate mode by using the multirate setting system 27 of the present invention.

In accordance with the present invention, the disk apparatus is provided with a multirate feedforward controller and a multirate D/A converter that operates with a sampling period in which the interruption period of servo information is divided into a multiplicity of parts. The target position trajectory that is input into a feedforward controller is given only a predetermined time advance. The target position trajectory is delayed relative to a following controller only by a predetermined time. By the above, it is possible for the head position to follow the target position trajectory very precisely. When implementing feedforward control according to the present invention, the internal variable of the following controller is not cleared to zero, therefore it is especially strong relative to a constant value external force. In the conventional systems, it is especially difficult to achieve speed-up of the short span seek when there is 100 tracks or less. The present invention, however, enables the short span seek to be more rapid than the prior art.

What is claimed is:

1. A disk apparatus for reading or writing on a disk using a head, comprising:
   a disk for storing information;
   a head for reading or writing information on said disk;
   a detector for detecting a position of said head relative to said disk with a predetermined sampling period;
   a calculation system for calculating a manipulated variable for positioning said head;
   a D/A converter for converting said manipulated variable from digital to analogue form;
   at least one or more timing registers storing timing values of conversion timing by said D/A converter; and
   at least one or more manipulated variable registers in which a manipulated variable is set in response to said timing values stored in said timing register.

2. The apparatus of claim 1, further comprising a comparator for comparing a value of said timing register with a value of a counter for counting the passing time from the start of head positioning, said comparator detecting a correspondence between said value of said timing register and a value of said counter; a selector determining a manipulated variable to be outputted to said D/A converter according to an output of said comparator, said determined manipulated variable being stored in a manipulated variable resister related to said timing register storing the value corresponding to said value of said counter.

3. A disk apparatus for reading or writing on a disk using a head, comprising:
   a disk for storing information;
   a head for reading or writing information on said disk;
   a detector for detecting a position signal representing a head position with a predetermined sampling period; and
   a controller for calculating a manipulated variable for positioning said head using a microprocessor;
   wherein said controller includes advance means for advancing a target position trajectory to move said head with a designated timing; a feedforward controller for obtaining a feedforward control variable based on a target trajectory, said feedforward controller being connected to said advance means; delay means for delaying the designated time for said target position trajectory; a feedback controller for obtaining a feedback control variable based on said target trajectory, said feedback controller being connected to said delay means.

4. The apparatus of claim 3 wherein said feedforward control variable is calculated at least one time after detecting said head position; and said feedback control variable is calculated at least one time after detecting said head position.

5. The apparatus of claim 3 wherein said target position trajectory is calculated based on a target acceleration trajectory for moving the head, said target acceleration trajectory being such as to accelerate and decelerate a head moving speed according to a trapezoidal function and to position said head at a target track on said disk according to an exponential function.

6. A method of controlling a disk apparatus for positioning a ad on a target track of a disk, comprising the steps of:
   reading a present head position from disk recorded information;
   calculating a remaining distance indicated by a gap between a target position and said present head position;
   calculating a manipulated variable to control the positioning said head using a microprocessor based on said remaining distance;
   converting a first manipulated variable from digital to analogue form based on said remaining distance;
   outputting a timing setting value to a respective timing register for setting a timing to convert said manipulated variable, and an output timing setting value for converting into digital/analogue form at least a second manipulated variable;

starting a timer for counting time from to start of head positioning;

comparing an output of said timer with an output of said timing register;

converting into digital/analogue form said second manipulated variable in response to a timing register in which is set a timing setting value corresponding to said timer output.

7. A method of controlling a disk apparatus for positioning a head on a target track of a disk, comprising the steps of:

reading a present head position from disk recorded information;

calculating a remaining distance indicated by a gap between a target position and said present head position;

calculating a manipulated variable to control the positioning said head using a microprocessor based on said remaining distance;

converting a first manipulated variable from digital to analogue form based on said remaining distance;

calculating a feedforward control variable based on a target trajectory advanced from a target position trajectory relative to a designated time; and calculating a feedback control variable based on a target trajectory delayed from said target position trajectory relative to another designated time.

8. The method of claim 7, wherein said calculation of said feedforward control variable is carried out for at least one time after detecting said present head position; and said calculation of said feedback control variable for is carried out at least one time after detecting said present head position.

* * * * *